(12) United States Patent
Inada et al.

(10) Patent No.: US 7,261,972 B2
(45) Date of Patent: Aug. 28, 2007

(54) NONAQUEOUS ELECTROLYTE SECONDARY BATTERY

(75) Inventors: Shusuke Inada, Minato-ku (JP); Masahiro Sekino, Minato-ku (JP); Akira Yajima, Minato-ku (JP); Nao Shimura, Minato-ku (JP); Masayuki Oguchi, Minato-ku (JP); Asako Satoh, Minato-ku (JP); Hiroshi Kitayama, Minato-ku (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/041,700

(22) Filed: Jan. 25, 2005

(65) Prior Publication Data

US 2005/0130035 A1    Jun. 16, 2005

Related U.S. Application Data

(63) Continuation of application No. PCT/JP03/09486, filed on Jul. 25, 2003.

(30) Foreign Application Priority Data

Jul. 25, 2002   (JP)   ............................. 2002-216957
Jul. 25, 2002   (JP)   ............................. 2002-216958

(51) Int. Cl.
*H01M 6/10* (2006.01)

(52) U.S. Cl. .................... 429/94; 429/164; 429/331; 429/329

(58) Field of Classification Search .................. 429/94, 429/340, 336, 341, 331, 161, 164, 329
See application file for complete search history.

(56) References Cited

U.S. PATENT DOCUMENTS 5,462,820 A * 10/1995 Tanaka ................. 429/331

2003/0118914 A1* 6/2003 Mori ...................... 429/340

FOREIGN PATENT DOCUMENTS

| JP | 2001-210381 | 8/2001 |
|---|---|---|
| JP | 2001-273881 | 10/2001 |
| JP | 2002-63937 | 2/2002 |
| JP | 2002-063937 | 2/2002 |
| JP | 2002-063941 | 2/2002 |
| JP | 2002-63941 | 2/2002 |
| JP | 2002-170567 | 6/2002 |
| JP | 2002-329528 | 11/2002 |
| JP | 2003-132946 | 5/2003 |
| JP | 2003-142152 | 5/2003 |
| JP | 2003-203673 | 7/2003 |
| JP | 2003-257479 | 9/2003 |
| KR | 2001-0082428 | 8/2001 |
| KR | 2002-0033633 | 5/2002 |

* cited by examiner

*Primary Examiner*—Laura Weiner
(74) *Attorney, Agent, or Firm*—Oblon, Spivak, McClelland, Maier & Neustadt, P.C.

(57) ABSTRACT

A nonaqueous electrolyte secondary battery includes an electrode group having a positive electrode and a negative electrode wound flatly by way of an interposed separator, a positive electrode tab electrically connected to the positive electrode, and projecting from a spiral winding surface of the electrode group, a negative electrode tab electrically connected to the negative electrode, and projecting from the spiral winding surface, and a nonaqueous electrolyte, wherein the nonaqueous solvent contains sultone compound including a ring having at least one double bond, and a distance between the positive electrode tab and the negative electrode tab is 6 mm to 18 mm.

22 Claims, 6 Drawing Sheets

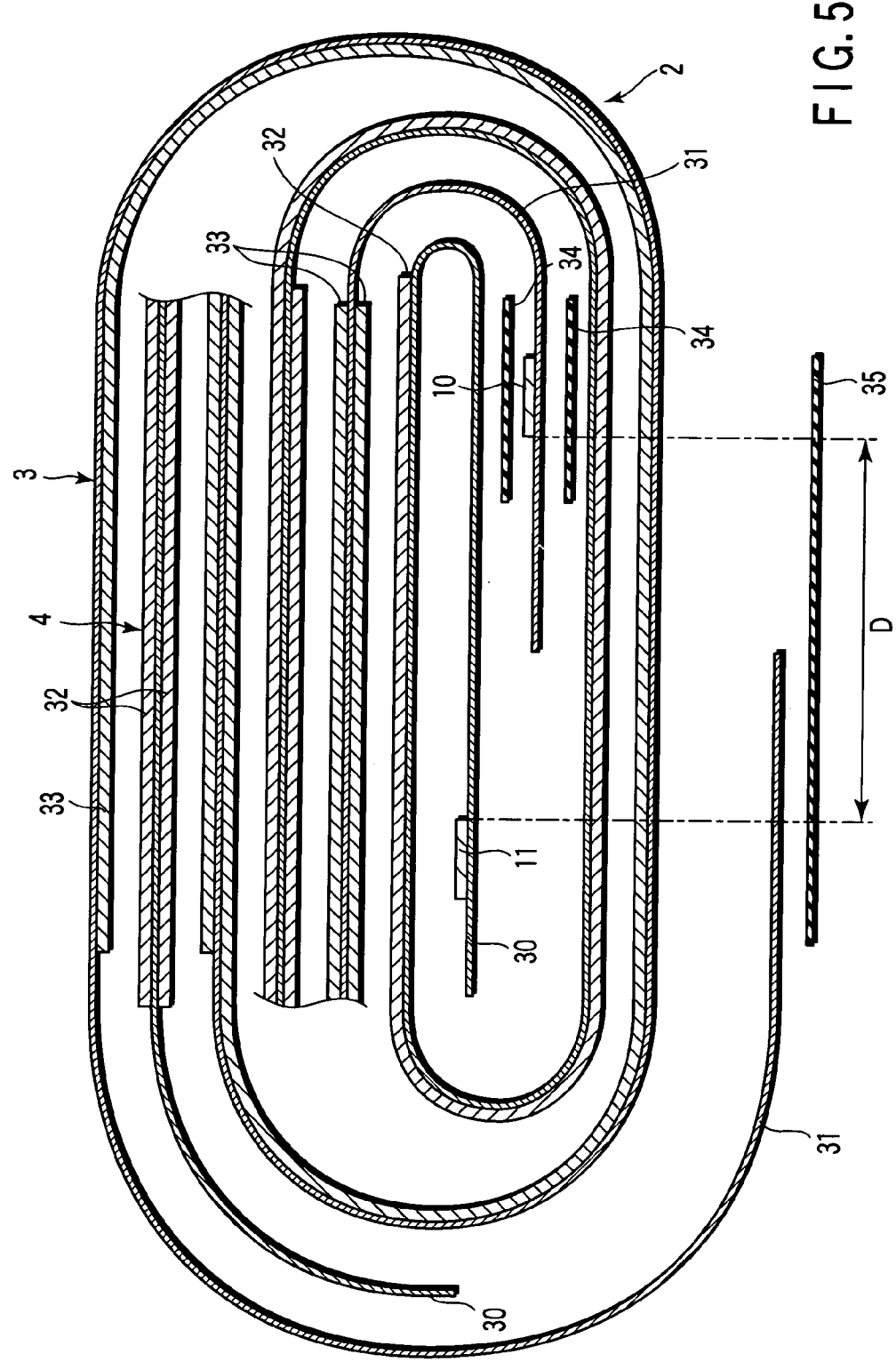
F I G. 5

NONAQUEOUS ELECTROLYTE SECONDARY BATTERY

CROSS REFERENCE TO RELATED APPLICATIONS

This is a Continuation Application of PCT Application No. PCT/JP03/09486, filed Jul. 25, 2003, which was published under PCT Article 21(2) in Japanese.

This application is based upon and claims the benefit of priority from prior Japanese Patent Applications No. 2002-216957, filed Jul. 25, 2002; and No. 2002-216958, filed Jul. 25, 2002, the entire contents of both of which are incorporated herein by reference.

BACKGROUND OF THE INVENTION

1. Field of the Invention

The present invention relates to a nonaqueous electrolyte secondary battery.

2. Description of the Related Art

Recently, with the current trend in downsizing electronic appliances such as mobile communication appliances, notebook computers, palmtop computers, camcorders, portable CD (MD) players, and cordless telephones, there is an increasing demand for batteries of smaller size and larger capacity as power sources for these electronic appliances.

Batteries widely used as power sources for these electronic appliances include primary batteries, such as an alkaline manganese battery, and secondary batteries such as a nickel cadmium battery and a lead battery. Among others, a nonaqueous electrolyte secondary battery comprising lithium composite oxide as a positive electrode active material and a carbonaceous material (graphitized material or carbon material) capable of intercalating and deintercalating lithium ions as a negative electrode active material has attracted attention because of its small size, light weight, high cell voltage, and high energy density.

As the negative electrode, instead of the carbonaceous material, lithium or lithium alloy can be used. In such a case, however, as the secondary battery repeats charging and discharging, dissolution and deposition of lithium are repeated, and an acicularly grown dendrite is formed, and as the dendrite penetrates through the separator, an internal short-circuit may occur. On other hand, the negative electrode comprising a carbonaceous material can suppress the growth of dendrites as compared with the negative electrode containing lithium or lithium alloy.

On the other hand, as a case for containing an electrode group including the positive electrode and negative electrode as described above, a laminate film obtained by laminating a metal foil such as aluminum and resin is formed like a bag or cup, and the nonaqueous electrolyte secondary battery is further reduced in weight and size.

As the nonaqueous electrolyte, a nonaqueous electrolyte comprising cyclic carbonate such as propylene carbonate (PC) or ethylene carbonate (EC) as a main solvent is known.

However, the nonaqueous electrolyte secondary battery comprising a nonaqueous electrolyte using a nonaqueous solvent including PC and EC generates gas as the nonaqueous solvent is decomposed at the time of initial charging, and the charging and discharging reaction is disturbed by this gas, which makes the initial charging and discharging efficiency poor. Also in the nonaqueous electrolyte secondary battery using such nonaqueous solvent, if a highly flexible laminate film case is used, the case may be deformed significantly due to gas generated in initial charging. Swelling of the case brings about various problems such as oversize of a battery in an electronic appliance and malfunction of an electronic appliance.

BRIEF SUMMARY OF THE INVENTION

It is hence an object of the invention to provide a nonaqueous electrolyte secondary battery in which generation of gas in initial charging is suppressed, and the initial charging and discharging efficiency is enhanced.

It is another object of the invention to provide a nonaqueous electrolyte secondary battery in which the gas generation amount in initial charging is reduced and the high-temperature long-term storage characteristic in the charged state is improved.

It is a further object of the invention to provide a nonaqueous electrolyte secondary battery in which distortion of an electrode group is suppressed when charging and discharging cycle is repeated.

According to a first aspect of the present invention, there is provided a nonaqueous electrolyte secondary battery comprising a positive electrode, a negative electrode including a carbonaceous material capable of intercalating and deintercalating lithium ions, and a nonaqueous electrolyte including a nonaqueous solvent, wherein the nonaqueous solvent contains cyclic carbonate including ethylene carbonate (EC) and propylene carbonate (PC), and sultone compound including a ring having at least one double bond, and the EC, PC and sultone compound are, supposing x (vol. %), y (vol. %), and z (vol. %) respectively, contained in the total volume of the nonaqueous solvent at the rate of $15 \leq x \leq 60$, $35 \leq y \leq 85$, and $0 < z \leq 10$.

According to a second aspect of the present invention, there is provided a nonaqueous electrolyte secondary battery comprising a positive electrode, a negative electrode including a carbonaceous material capable of intercalating and deintercalating lithium ions, and a nonaqueous electrolyte including a nonaqueous solvent, wherein the nonaqueous solvent contains cyclic carbonate including ethylene carbonate (EC) and propylene carbonate (PC), γ-butyrolactone (GBL), and sultone compound including a ring that has at least one double, and the EC, PC, GBL, and sultone compound are, supposing a (vol. %), b (vol. %), c (vol. %), and d (vol. %) respectively, contained in the total volume of the nonaqueous solvent at the rate of $15 \leq a \leq 50$, $20 < b \leq 70$, $10 < c \leq 50$, and $0 < d \leq 10$.

According to a third aspect of the present invention, there is provided a nonaqueous electrolyte secondary battery comprising an electrode group having a positive electrode and a negative electrode wound flatly by way of an interposed separator, a positive electrode tab electrically connected to the positive electrode, and projecting from a spiral winding surface of the electrode group, a negative electrode tab electrically connected to the negative electrode, and projecting from the spiral winding surface, and a nonaqueous electrolyte, wherein the nonaqueous solvent contains sultone compound including a ring that has at least one double bond, and a distance between the positive electrode tab and the negative electrode tab is 6 mm to 18 mm.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 5 is a cross sectional view showing one embodiment of an electrode group for use in the nonaqueous electrolyte secondary battery in FIG. 1 or FIG. 3.

DETAILED DESCRIPTION OF THE INVENTION

Figure 1:
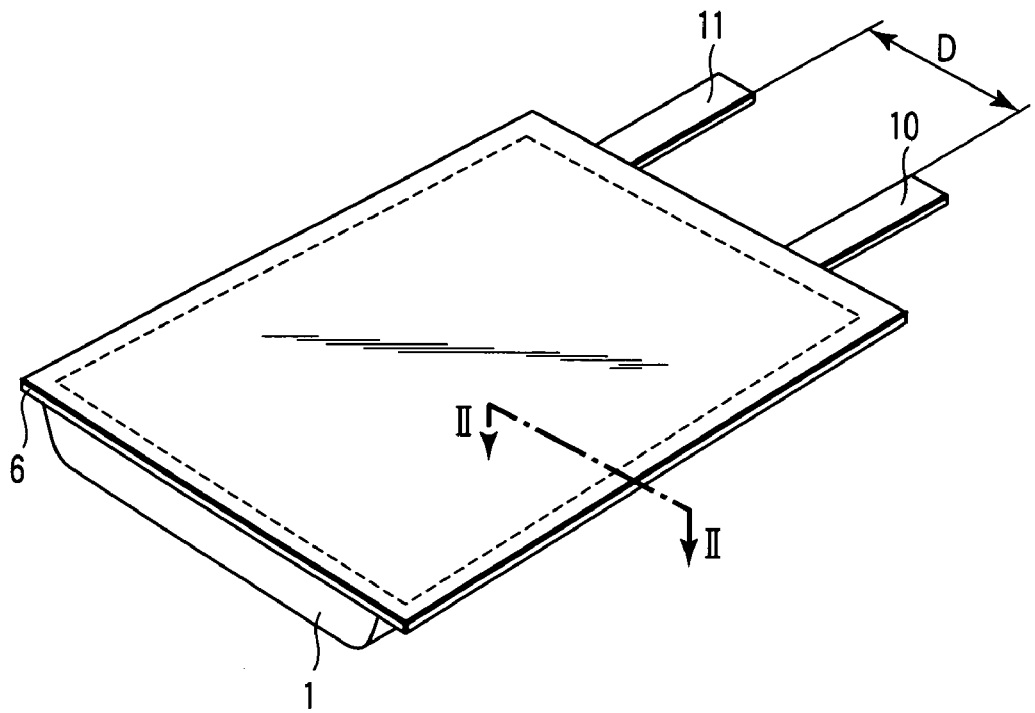
FIG. 1 is a perspective view showing a thin type nonaqueous electrolyte secondary battery as one embodiment of a nonaqueous electrolyte secondary battery according to the invention.

A nonaqueous electrolyte secondary battery of a first embodiment according to the invention comprises a case, an electrode group contained in the case, and a nonaqueous electrolyte including a nonaqueous solvent.

The nonaqueous solvent contains cyclic carbonate including ethylene carbonate (EC) and propylene carbonate (PC), and a sultone compound having a ring having at least one double bond.

The electrode group, positive electrode, negative electrode, separator, nonaqueous electrolyte, and case will be specifically described below.

1) Electrode Group

The electrode group is fabricated in any method of, for example, (i) winding a positive electrode and a negative electrode flatly or spirally by way of a separator interposed therebetween, (ii) winding a positive electrode and a negative electrode spirally by way of a separator interposed therebetween, and compressing in a radial direction, (iii) folding once or more a positive electrode and a negative electrode by way of a separator interposed therebetween, or (iv) laminating a positive electrode and a negative electrode by way of a separator interposed therebetween.

The electrode group may not be pressed necessarily, but can be pressed in order to reinforce the integrating strength of the positive electrode, negative electrode and separator. Or it can be heated at the time of pressing.

The electrode group may also contain an adhesive polymer in order to reinforce the integrating strength of the positive electrode, negative electrode and separator. Such adhesive polymer is desired to maintain a high adhesion while holding the nonaqueous electrolysis solution. Such polymer is more preferably when the lithium ion conductivity is higher. Specific examples include polyacrylonitrile (PAN), polyacrylate (PMMA), polyvinylidene fluoride (PVdF), polyvinyl chloride (PVC), and polyethylene oxide (PEO).

2) Positive Electrode

The positive electrode comprises a current collector, and a positive electrode layer containing an active material, being held on one side or both surfaces of the current collector.

The positive electrode layer includes a positive electrode active material, a binder, and a conductive agent.

The positive electrode active material is made of various oxides, such as manganese dioxide, lithium-manganese composite oxide, lithium-containing nickel oxide, lithium-containing cobalt oxide, lithium-containing nickel-cobalt oxide, lithium-containing iron oxide and vanadium oxide containing lithium. And the positive electrode active material can be made of other chalcogen compounds such as titanium disulfide and molybdenum disulfide. In particular, it is preferred to use lithium-containing cobalt oxide (for example, $LiCoO_2$), lithium-containing nickel-cobalt oxide (for example, $LiNi_{0.8}Co_{0.2}O_2$), or lithium-manganese composite oxide (for example, $LiMn_2O_4$, $LiMnO_2$) because a high voltage is obtained. As the positive electrode active material, one kind of oxide may be used alone, or two or more oxides may be used in mixture.

The conductive agent is, for example, acetylene black, carbon black, or graphite.

The binder functions to hold the active material in the current collector and link the active materials together. Examples of the binder include polytetrafluoroethylene (PTFE), polyvinylidene fluoride (PVdF), polyether sulfone, ethylene-propylene diene copolymer (EPDM), and styrene butadiene rubber (SBR).

The blending rate of the positive electrode active material, conductive agent, and binder is preferred to be in a range of 80 to 95 wt. % of the positive electrode active material, 3 to 20 wt. % of the conductive agent, and 2 to 7 wt. % of the binder.

As the current collector, either a porous conductive substrate or a non-porous conductive substrate may be used. These conductive substrates may be formed of, for example, aluminum, stainless steel or nickel.

The positive electrode is fabricated, for example, by suspending the positive electrode active material, conductive agent, and binder in a proper solvent, applying this suspension on the current collector, and drying and forming into a thin plate.

3) Negative Electrode

The negative electrode comprises a current collector, and a negative electrode layer held on one side or both surfaces of the current collector.

The negative electrode layer includes a carbonaceous material for intercalating and deintercalating lithium ions, and a binder.

The carbonaceous material is, for example, a graphitized material or carbon material such as graphite, coke, carbon fiber, spherical carbon, pyrolytic vapor phase carbonaceous material, and baked resin; a graphitized material or carbon material obtained by heat treatment at 500 to 3000° C. from thermosetting resin, isotropic pitch, mesophase pitch carbon, mesophase pitch-based carbon fiber, mesophase microbeads, and the like. In particular, mesophase pitch-based carbon fiber is preferred because the capacity and charging and discharging cycle characteristic are enhanced. Above all, it is preferred to use graphitized material having graphite crystals of which layer spacing $d_{002}$ Of (002) plane is 0.34 nm or less. The nonaqueous electrolyte secondary battery having the negative electrode containing such graphitized material as carbonaceous material is capable of remarkably enhancing the battery capacity and high-rate discharge capacity. The layer spacing $d_{002}$ is particularly preferred to be 0.337 nm or less.

The binder is, for example, polytetrafluoroethylene (PTFE), polyvinylidene fluoride (PVdF), ethylene-propylene diene copolymer (EPDM), styrene butadiene rubber (SBR), carboxy methyl cellulose (CMC), and the like.

The blending rate of the carbonaceous material and the binder is preferably in a range of 90 to 98 wt. % of the carbonaceous material and 2 to 20 wt. % of the binder.

As the current collector, either a porous conductive substrate or a non-porous conductive substrate can be used. These conductive substrates can be formed of, for example, copper, stainless steel or nickel.

The negative electrode is fabricated, for example, by kneading the carbonaceous material for intercalating and deintercalating lithium ions and the binder in the presence of a solvent, applying the obtained suspension on the current collector, and drying, then pressing at a predetermined pressure once or two or five times in multiple stages.

4) Separator

The separator can be made of microporous film, woven cloth, nonwoven cloth, or laminated sheet of same or different materials thereof. Materials for forming the separator include polyethylene, polypropylene, ethylene-propylene copolymer, and ethylene-butene copolymer. The separator can be made of one or two or more materials selected from the above materials.

The thickness of the separator is preferred to be 30 μm or less, and more preferably 25 μm or less. The lower limit of the thickness is preferred to be 5 μm, or more preferably the lower limit is 8 μm.

The coefficient of thermal shrinkage of the separator is preferred to be 20% or less in the condition of 120° C. and 1 hour. The coefficient of thermal shrinkage is more preferred to be 15% or less.

The porosity of the separator is preferred to be in a range of 30 to 60%. A more preferred range of the porosity is 35 to 50%.

The air permeability of the separator is preferred to be 600 sec/100 cm$^3$ or less. The air permeability refers to the time (in seconds) required for 100 cm$^3$ of air to pass through the separator. The upper limit of the air permeability is preferred to be 500 sec/100 cm$^3$. The lower limit of the air permeability is preferred to be 50 sec/100 cm$^3$, and a more preferred lower limit is 80 sec/100 cm$^3$.

The width of the separator is preferred to be wider than the width of the positive electrode and negative electrode.

Such configuration is effective to prevent direct contact of the positive electrode and negative electrode without intervention of the separator.

5) Nonaqueous Electrolyte

The nonaqueous electrolyte having substantially liquid or gel form can be used. In the case of gel nonaqueous electrolyte, if the case is broken due to some external force, risk of leak of the nonaqueous electrolyte to outside is lowered. In the case of liquid nonaqueous electrolyte, on the other hand, the ion conductivity is higher than in the gel nonaqueous electrolyte, so that the high rate discharge characteristic and low temperature discharge characteristic of the nonaqueous electrolyte secondary battery can be enhanced.

The nonaqueous electrolyte can be prepared in any one of the methods (I) to (VI) explained below.

(I) A nonaqueous electrolysis solution (liquid nonaqueous electrolyte) is obtained by dissolving electrolyte (for example, lithium salt) in a nonaqueous solvent.

(II) An organic polymer compound and lithium salt are dissolved in a solvent, thereby a polymer solution is obtained. This polymer solution is applied or impregnated in a positive electrode and/or a negative electrode, or separator, or both electrode and separator, and is cast by evaporating the solvent. A separator is interposed between the positive electrode and the negative electrode, and an electrode group is obtained. The electrode group is contained in a case, and a nonaqueous electrolysis solution is poured in, and by holding the nonaqueous electrolysis solution in the cast polymer film, a secondary battery having a gel nonaqueous electrolyte is obtained.

(III) In the method of (II), instead of the organic polymer compound, a crosslinking polymer can be used. For example, (a) a prepolymer solution is prepared from a compound having a crosslinking functional group, a lithium salt, and a solvent, and it is applied or impregnated in a positive electrode and/or a negative electrode, or separator, or both electrode and separator, and a compound having a crosslinking functional group is crosslinked. A separator is interposed between the positive electrode and the negative electrode, and an electrode group is obtained. The crosslinking process can be either before or after the solvent evaporating process, or in the case of crosslinking by heating, it can be crosslinked while evaporating the solvent. Alternatively, (b) after applying or impregnating a prepolymer solution in a positive electrode and/or a negative electrode, or separator, or both electrode and separator, a separator is interposed between the positive electrode and the negative electrode, and an electrode group is obtained. Consequently, the crosslinking process can be executed.

The crosslinking method is not particularly specified, but considering the convenience and cost of the equipment, it is preferred to crosslink by heating polymerization or light polymerization by ultraviolet ray. When crosslinking by heating or ultraviolet irradiation, it is required to add a polymerization initiating agent suited to the method of polymerization in the prepolymer solution. The polymerization initiating agent is not limited to one type, but two or more types can be mixed.

(IV) An organic polymer compound and lithium salt are directly dissolved in a nonaqueous solvent, and a gel electrolyte is obtained. This gel electrolyte is applied or impregnated in a positive electrode and/or a negative electrode, or separator, or both electrode and separator, and a separator is interposed between the positive electrode and the negative electrode, and a secondary battery having a gel nonaqueous electrolyte is obtained.

(V) In the method of (IV), instead of the organic polymer compound, a crosslinking polymer can be used. For example, a pregel solution is prepared from a compound having a crosslinking functional group, a lithium salt, and an electrolysis solution, and it is applied or impregnated in a positive electrode and/or a negative electrode, or separator, or both electrode and separator, and a compound having a crosslinking functional group is crosslinked. The crosslinking process can be either before or after the electrode group fabricating process.

The crosslinking method is not particularly specified, but considering the convenience and cost of the equipment, it is preferred to crosslink by heating polymerization or light polymerization by ultraviolet ray. When crosslinking by heating or ultraviolet irradiation, it is required to add a polymerization initiating agent suited to the method of polymerization in the pregel solution. The polymerization initiating agent is not limited to one type, but two or more types can be mixed.

(VI) An electrode group having a separator interposed between a positive electrode and a negative electrode is put in a case. The gel nonaqueous electrolyte of (IV) is impregnated in the electrode group, and the case is sealed, and a secondary battery having a gel nonaqueous electrolyte is obtained. Alternatively, the pregel solution of (V) is impregnated in the electrode group, and the pregel solution is crosslinked before or after sealing the case, and a secondary battery having a gel nonaqueous electrolyte is obtained.

Examples of the organic polymer compound of (II) and (IV) include alkylene oxide such as polyethylene oxide and polypropylene oxide, or a polymer having a derivative thereof as skeleton; vinylidene fluoride, propylene hexafluoride, ethylene tetrafluoride, perfluoroalkyl vinyl ether, or a copolymer thereof; polyacrylonitrile or polyacrylate polymer comprising copolymer between acrylonitrile and methyl acrylate and being mainly composed of polyacrylonitrile, vinyl pyrrolidone or vinyl acetate as skeleton; polyether polymer; polycarbonate polymer; polyacrylonitrile polymer; polyester polymer having polyethylene terephthalate, polybutylene terephthalate, or a derivative thereof as skeleton, being polymerized with ethyl methacrylate, styrene or vinyl acetate; fluorine resin; polyolefin resin; polyether resin; a copolymer composed of two or more types thereof; and the like. From a monomer or oligomer as precursor of these polymers, prepolymer solution (III) or pregel solution (V) can be prepared.

The nonaqueous solvent and electrode contained in the liquid nonaqueous electrolyte and gel nonaqueous electrolyte will be described below.

Various solvents for composing the nonaqueous solvent will be explained.

a. Cyclic Carbonate

Cyclic carbonate contains ethylene carbonate (EC) and propylene carbonate (PC) as essential components.

While EC and PC are causative factors of generation of gas in initial charging, in the coexistence of PC and EC and sultone compound, they function to enhance the density of the protective film formed on the negative electrode surface.

The ratio (x) of EC in the total volume of nonaqueous solvent is preferred to be in a range of 15 to 60 vol. %. The reason is as follows. If the ratio (x) of EC in the total volume of the nonaqueous solvent is less than 15 vol. %, the density of the protective film formed on the negative electrode surface is lowered, making it hard to decrease the gas generation in initial charging and enhance the initial charging and discharging efficiency. On the other hand, if the EC ratio (x) is more than 60 vol. %, the viscosity of the nonaqueous electrolyte is enhanced, and the ion conductivity is lowered, which lowers the initial charging and discharging efficiency and the initial capacity.

A more preferred range of the EC ratio (x) is 20 to 60 vol. %, and a further preferred ratio (x) is in a range of 25 to 55 vol. %.

The ratio (y) of PC is preferred to be in a range of 35 to 85 vol. %. The reason is as follows. If the ratio (y) of PC is less than 35 vol. %, the density of the protective film formed on the negative electrode surface cannot be heightened sufficiently, so that the initial charging and discharging efficiency drops. On the other hand, if the PC ratio (y) is more than 85 vol. %, the reaction of the negative electrode and PC easily occurs in initial charging, and even in the presence of EC and sultone compound, making it hard to suppress gas generation, accompanying swelling of battery case and drop of initial charging and discharging efficiency.

A more preferred range of the PC ratio (y) is 40 vol. % or more to 80 vol. % or less, and a further preferred range is 40 vol. % or more to 75 vol. % or less.

b. Sultone Compound having at Least One Double Bond in Ring

Herein, as a sultone compound having a ring having at least one double bond, either a sultone compound A expressed in the following chemical formula 1, or a sultone compound B having at least one H of the sultone A compound replaced by a hydrocarbon group can be used. In the present invention, the sultone compound A or sultone compound B can be used either alone, or both the sultone compound A and the sultone compound B can be used together:

[Chemical formula 1]

where $C_mH_n$ is a straight-chain hydrocarbon group, and m and n are integers of 2 or more satisfying the relation of 2m>n.

In a sultone compound having a double bond in a ring, the double bond is opened by the reducing reaction with the negative electrode to induce polymerization reaction, so that a protective film can be formed on the negative electrode surface without generating gas. At this time, when EC and PC are present, a dense protective film excellent in lithium ion permeability can be formed. Since this protective film also acts to suppress the decomposition reaction of EC and PC in initial charging, the amount of gas generated in initial charging is suppressed, and the initial charging and discharging efficiency can be enhanced.

The ratio (z) of the sultone compound is preferred to be 10 vol. % or less. That is, if the sultone compound ratio (z) exceeds 10 vol. %, the lithium ion permeability of the protective film is lowered, and the impedance of the negative electrode increases, and thereby sufficient capacity or charging and discharging efficiency may not be obtained. Further, in order to maintain the design capacity of the electrode and keep the initial charging and discharging efficiency high, the sultone compound ratio (z) is preferred to be 4 vol. % or less.

Further, in order to assure enough forming amount of the protective film, the sultone compound ratio (z) is desirably at least 0.01 vol. %. Moreover, when the sultone compound ratio (z) is 0.1 vol. % or more, the protective function by the protective film such as suppression of gas generation in initial charging is sufficient.

A preferred sultone compound is a sultone compound A, in particular, a compound in which m=3 and n=4, that is, 1,3-propene sultone (PRS), or a compound in which m=4 and n=6, that is, 1,4-butylene sultone (BTS). This is because protective films derived from these compounds are high in the effect of suppressing the decomposition reaction of PC and EC in initial charging. As the sultone compound, 1,3-propene sultone (PRS) or 1,4-butylene sultone (BTS) can be used alone, or both PRS and BTS can be used together.

c. γ-butyrolactone (GBL)

The nonaqueous solvent preferably contains GBL. When the GBL is contained in the nonaqueous solvent by a ratio (v) of 10 vol. % or less in the total volume of the nonaqueous solvent, the ion conductivity of the nonaqueous electrolyte is heightened, making it possible to enhance the initial charging and discharging efficiency and the discharge rate characteristic of the secondary battery. However, when the GBL ratio (v) exceeds 10 vol. %, the reactivity of negative electrode and GBL becomes higher particularly at high temperature, making the capacity recovery rate after storing under high temperature environment in discharge state is lower, or the charging and discharging cycle life may be shorter. In order to obtain a sufficient effect due to addition of GBL, it is preferred to keep the lower limit of the GBL ratio (v) in the total volume of the nonaqueous solvent at 0.1 vol. %. A more preferred range of the GBL ratio (v) is 0.5 to 8 vol. %.

d. Subsidiary Components

The nonaqueous solvent may contain other solvents than EC, PC, the sultone compound and GBL.

Subsidiary components include, for example, vinylene carbonate (VC), vinylethylene carbonate (VEC), phenylethylene carbonate (phEC), diethyl carbonate (DEC), dimethyl carbonate (DMC), ethyl methyl carbonate (EMC), γ-valerolactone (VL), methyl propionate (MP), ethyl propionate (EP), 2-methylfurane (2Me-F), furane (F), thiophene (TIOP), catechol carbonate (CATC), ethylene sulfite (ES), 12-crown-4 (Crown), tetraethylene glycol dimethyl ether (Ether), and 1,3-propane sultone (PS). As subsidiary components, one type may be used alone, or two or more types may be used together.

Above all, it is preferred to contain at least one of vinylene carbonate (VC) and diethyl carbonate (DEC). A subsidiary component containing DEC can heighten the ion conductivity of the nonaqueous electrolyte and enhance the discharge rate characteristic of the secondary battery. A subsidiary component containing VC can heighten the density of the protective film on the negative electrode surface without sacrificing the lithium ion permeability of the negative electrode, and substantially decrease the amount of gas generated in initial charging and further enhance the initial charging and discharging efficiency. Also a subsidiary component containing VC can enhance the discharge rate characteristic of the secondary battery.

The ratio (w) by volume of the subsidiary component in the nonaqueous solvent is preferred to be in a range of 10 vol. % or less. If the volume ratio (w) of the subsidiary component is more than 10 vol. %, gas may be generated by self-decomposition reaction of the subsidiary component under high temperature environment. A more preferred range of the volume ratio (w) of the subsidiary component is 0.01 to 5 vol. %.

The electrolyte to be dissolved in the nonaqueous solvent is, for example, a lithium salt such as lithium perchlorate ($LiClO_4$), lithium hexafluoro phosphate ($LiPF_6$), lithium tetrafluoro borate ($LiBF_4$), lithium hexafluoro arsenate ($LiAsF_6$), lithium trifluoromethasulfonate ($LiCF_3SO_3$), bistrifluoromethyl sulfonylimide lithium [($LiN(CF_3SO_2)_2$], and $LiN(C_2F_5SO_2)_2$. One type, or two or more types of electrolytes may be used.

Above all, it is preferred to contain $LiPF_6$ or $LiBF_4$. Alternatively, by using a mixed salt A comprising an imide salt made of at least one of $LiN(CF_3SO_2)_2$ and $LiN(C_2F_5SO_2)_2$, and a salt made of at least one of $LiBF_4$ and $LiPF_6$, or a mixed salt B comprising $LiBF_4$ and $LiPF_6$, the cycle life at high temperature may be further enhanced. Further, since the thermal stability of the electrolyte can be enhanced, it is effective to suppress voltage drop due to self-discharge during storage under high temperature environment.

The dissolving amount of the electrolyte in the nonaqueous solvent is preferred to be 0.5 to 2.5 mol/L. A more preferred range is 0.8 to 2 mol/L.

To improve wettability with the separator, the liquid nonaqueous electrolyte is preferred to contain a surfactant such as trioctyl phosphate (TOP). The amount of addition of the surfactant is preferred to be 3% or less, and more preferably in a range of 0.1 to 1%.

The amount of the liquid nonaqueous electrolyte is preferred to be 0.2 to 0.6 g per 100 mAh of battery unit capacity. A more preferred range of the liquid nonaqueous electrolyte is 0.25 to 0.55 g/100 mAh.

6) Case (Storing Case)

The case can be formed in various shapes including a cylindrical shape with bottom, a prismatic shape with bottom, a bag, a cup, etc.

The case can be formed from a sheet including a resin layer, a metal plate, a metal film, or the like.

The resin layer contained in the sheet is formed from, for example, polyolefin (for example, polyethylene or polypropylene), polyamide, etc. The sheet is preferably a laminated film of a metal layer and protective layers provided at both sides of the metal layer. The metal layer has a role of shutting off moisture, and retaining the shape of the case. The metal layer is made of, for example, aluminum, stainless steel, iron, copper, nickel, etc. In particular, aluminum is preferred because of its light weight and moisture shielding function. The metal layer is made of one metal, or two or more metal layers by integration. Of the two protective layers, the protective layer contacting with the outside has a role of preventing damage of the metal layer. This protective layer is made of one resin layer, or two or more resin layers. On the other hand, the inside protective layer has a role of preventing corrosion of the metal layer by the nonaqueous electrolyte. This inside protective layer is made of one resin layer, or two or more resin layers. On the surface of the inside protective layer, a thermoplastic resin can be arranged in order to seal the case by heat seal.

The metal plate and the metal film are made of, for example, iron, stainless steel, and aluminum.

The thickness of the case (the case wall thickness) is preferred to be 0.3 mm or less. If the thickness is more than 0.3 mm, it is hard to obtain high weight energy density and volume energy density. A preferred range of the thickness of the case is 0.25 mm or less, a more preferred range is 0.15 mm or less, and most preferred range is 0.12 mm or less. If the thickness is less than 0.05 mm, it is likely to be deformed or torn, and hence the lower limit of the thickness of the case is preferred to be 0.05 mm.

The thickness of the case is measured as follows. That is, in a region excluding the sealing portion of the case, three points mutually apart from each other by 1 cm or more are arbitrarily selected, the thickness is measured at each point, and the average is calculated to obtain as the thickness of the case. If foreign matter (such as resin) sticks to the surface of the case, the thickness must be measured after removing this foreign matter. For example, if PVdF sticks to the surface of the case, the PVdF is removed by wiping the case surface with a dimethyl formamide solution, and then the thickness is measured.

Forming an adhesive layer at least in part of the surface of the case, it is preferred to adhere the electrode group to the inner surface of the case by this adhesive layer. In such configuration, the case can be fixed to the surface of the electrode group, and permeation of the electrolysis solution into the gap between the electrode group and the case can be suppressed.

The nonaqueous electrolyte secondary battery according to the invention can be applied to various shapes of the nonaqueous electrolyte secondary battery, such as thin type, prismatic type, cylindrical type, and coin type. Examples of thin type, prismatic type, and cylindrical type nonaqueous electrolyte secondary batteries are shown in FIGS. 1 to 4.

Figure 2:
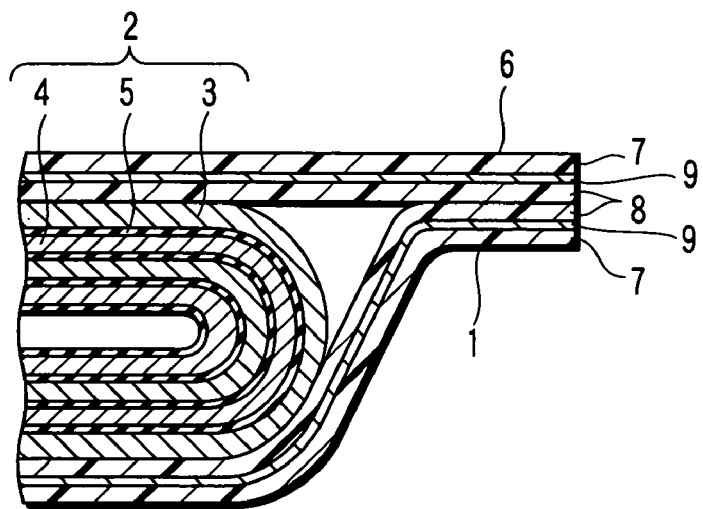
FIG. 2 is a partial sectional view of the thin type nonaqueous electrolyte secondary battery, taken along line II-II in FIG. 1.
Figure 3:
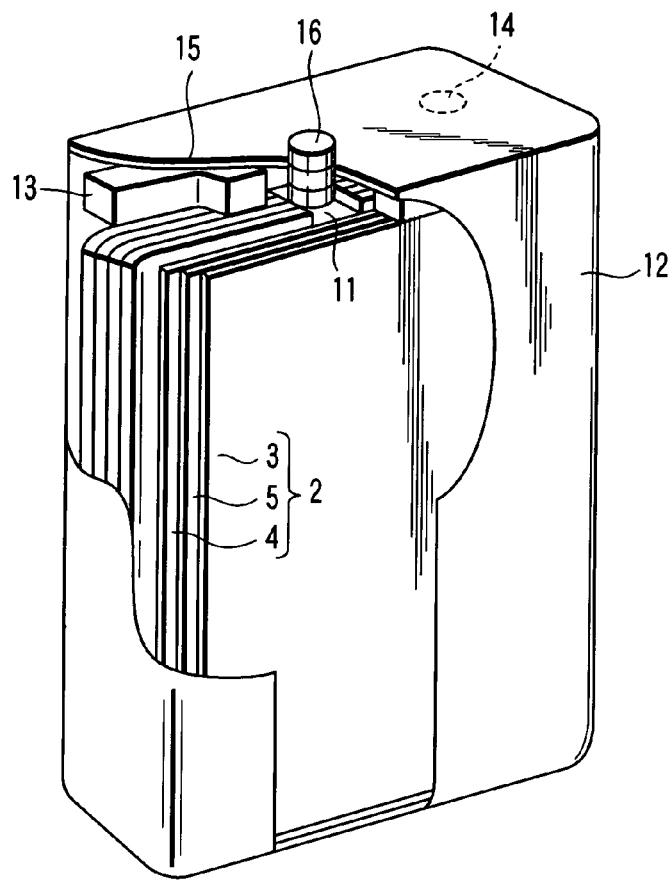
FIG. 3 is a partial cut-away perspective view showing a prismatic type nonaqueous electrolyte secondary battery as one embodiment of the nonaqueous electrolyte secondary battery according to the invention.
Figure 4:
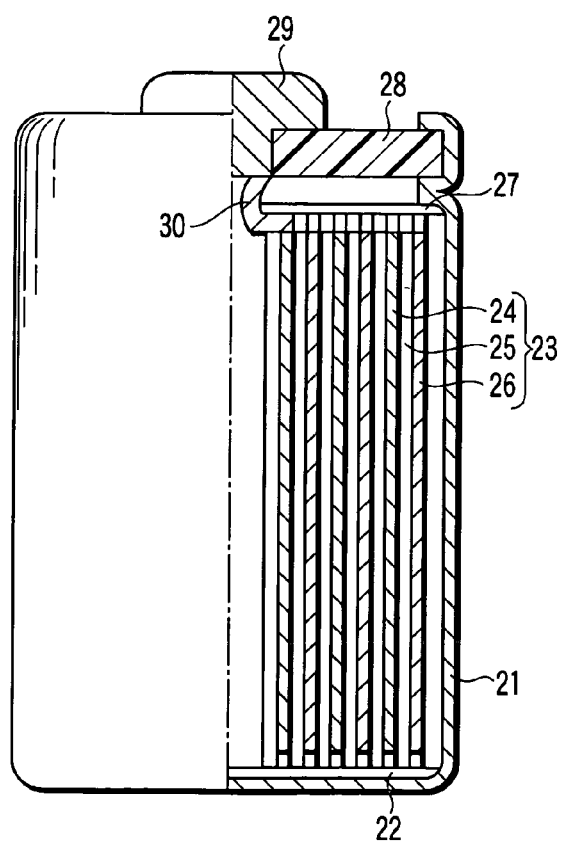
FIG. 4 is a partial cut-away sectional view showing a cylindrical type nonaqueous electrolyte secondary battery as one embodiment of the nonaqueous electrolyte secondary battery according to the invention.

FIG. 1 is a perspective view showing a thin type nonaqueous electrolyte secondary battery as one embodiment of the nonaqueous electrolyte secondary battery according to the invention, FIG. 2 is a partial sectional view taken along line II-II of the thin type nonaqueous electrolyte secondary battery in FIG. 1, FIG. 3 is a partial cut-away perspective view showing a prismatic type nonaqueous electrolyte secondary battery as one embodiment of the nonaqueous electrolyte secondary battery according to the invention, and FIG. 4 is a partial cut-away sectional view showing a cylindrical type nonaqueous electrolyte secondary battery as one embodiment of the nonaqueous electrolyte secondary battery according to the invention.

First, a thin type nonaqueous electrolyte secondary battery will be explained.

As shown in FIG. 1, an electrode group 2 is put in a case main body 1 of a rectangular cup shape. The electrode group 2 has a laminated structure including a positive electrode 3, a negative electrode 4, and a separator 5 arranged between the positive electrode 3 and the negative electrode 4, being wound in a flat shape. A nonaqueous electrolyte is held in the electrode group 2. A part of the edge of the case main body 1 is wide, and functions as a lid plate 6. The case main body 1 and the lid plate 6 are formed of a laminated film, respectively. The laminated film comprises an outside protective layer 7, an inside protective layer 8 containing a thermoplastic resin, and a metal layer 9 arranged between the outside protective layer 7 and the inside protective layer 8. The lid plate 6 is fixed in the case main body 1 by heat seal, using the thermoplastic resin of the inside protective layer 8, and thereby the electrode group 2 is sealed in the case. A positive electrode tab 10 is electrically connected to the positive electrode 3, and a negative electrode tab 11 is electrically connected to the negative electrode 4, and they are drawn out to the outside of the case to play the roles of a positive electrode terminal and a negative electrode terminal, respectively.

In the thin type nonaqueous electrolyte secondary battery shown in FIGS. 1 and 2, a cup-shaped case is shown, but the shape of the case is not particularly specified, and, for example, a bag-shaped case can be used.

Next, a prismatic type nonaqueous electrolyte secondary battery will be explained.

As shown in FIG. 3, an electrode group 2 is put in a rectangular tubular case 12 with bottom made of aluminum or other metal. The electrode group 2 is formed by laminating a positive electrode 3, a separator 5, and a negative electrode 4 in this sequence, and wound flatly. A spacer 13 having an opening near the center is arranged above the electrode group 2.

A nonaqueous electrolyte is held in the electrode group 2. A sealing plate 15 having a rupture mechanism 14 and a circular hole opened near the center thereof is connected to the opening of the case 12 by laser welding. A negative electrode terminal 16 is arranged in the circular hole of the sealing plate 15 by way of hermetic seal. A negative electrode tab 11 drawn out from the negative electrode 4 is welded to the lower end of the negative electrode terminal 16. On the other hand, a positive electrode tab (not shown) is connected to the case 12 which functions also as a positive electrode terminal.

Next, a cylindrical type nonaqueous electrolyte secondary battery will be explained.

A cylindrical case 21 made of stainless steel has an insulator 22 arranged in the bottom thereof. An electrode group 23 is put in the case 21. The electrode group 23 is a hoop formed by laminating a positive electrode 24, a separator 25, a negative electrode 26, and a separator 25, which is spirally wound such that the separator 25 is positioned at the outer side thereof.

A nonaqueous electrolyte is contained in the case 21. An insulating paper 27 having a central opening is arranged above the electrode group 23 in the case 21. An insulating sealing plate 28 is fixed to the upper opening of the case 21 by crimping. A positive electrode terminal 29 is fitted to the center of the insulating sealing plate 28. One end of a positive electrode lead 30 is connected to the positive electrode 24, and the other end is connected to the positive electrode terminal 29. The negative electrode 26 is connected to the case 21 serving also as a negative electrode terminal by way of a negative electrode lead (not shown).

The nonaqueous electrolyte secondary battery of the first embodiment according to the invention described above is a nonaqueous electrolyte secondary battery comprising a positive electrode, a negative electrode including a carbonaceous material capable of intercalating and deintercalating lithium ions, and a nonaqueous electrolyte including a nonaqueous solvent.

The nonaqueous solvent contains cyclic carbonate including ethylene carbonate (EC) and propylene carbonate (PC), and a sultone compound having a ring having at least one double bond.

The EC, PC and sultone compound are, supposing x (vol. %), y (vol. %), and z (vol. %) respectively, contained in the total volume of the nonaqueous solvent at the rate of $15 \leq x \leq 60$, $35 \leq y \leq 85$, and $0 < z \leq 10$.

According to such secondary battery, a dense protective film excellent in lithium ion permeability can be formed without generating gas. As a result, in initial charging, a protective film can be formed, and gas generation due to decomposition of cyclic carbonate can be suppressed, so that a high initial charging and discharging efficiency can be obtained without deterioration of capacity. As the same time, the amount of gas generated in high temperature storage and initial charging can be decreased, so that swelling of the battery case can be suppressed.

Although this protective film is high in lithium ion permeability, it is low in permeability of other solvent components (cyclic carbonate, GBL, etc.), and hence it can suppress reaction between the negative electrode and the other solvent (cyclic carbonate, GBL, etc.) occurring during charging or discharging. Therefore, increase of impedance and decrease of the discharge capacity accompanying progress of the charging and discharging cycle can be suppressed, so that the charging and discharging cycle life can be extended.

Incidentally, since the sultone compound is likely to form a protective film so as to cover the entire surface of the negative electrode, the interface resistance of the formed protective film tends to be higher due to synergistic effects of the EC, PC and the sultone compound. On the other hand, since the protective film by the vinylene carbonate (VC) is likely to be formed selectively in the edge of the negative electrode, it is excellent in the lithium ion permeability, but is insufficient in protection of the negative electrode surface. When the secondary battery includes the negative electrode containing a carbonaceous material such as a mesophase pitch-based carbon material or a mesophase pitch-based graphitized material, and the nonaqueous solvent that contains the EC, PC, sultone compound and VC, the density of the protective film of the negative electrode surface can be enhanced without increasing the interface resistance of the negative electrode, and therefore the initial charging and discharging efficiency and the initial capacity of the secondary battery can be further enhanced.

A nonaqueous electrolyte secondary battery of a second embodiment according to the invention will be explained below.

The nonaqueous electrolyte secondary battery of the second embodiment according to the invention comprises a case, an electrode group contained in the case, and a nonaqueous electrode held in the electrode group and including a nonaqueous solvent.

The nonaqueous solvent contains cyclic carbonate including ethylene carbonate (EC) and propylene carbonate (PC), γ-butyrolactone (GBL), and a sultone compound having a ring having at least one double bond.

The electrode group, positive electrode, negative electrode, separator and case of the nonaqueous electrolyte secondary battery of the second embodiment according to the invention are same as explained in the nonaqueous electrolyte secondary battery of the first embodiment according to the invention. The nonaqueous electrolyte will be explained below.

The nonaqueous electrolyte having a substantially liquid or gel form can be used. In the case of the gel nonaqueous electrolyte, if the case is broken due to some external force, risk of leak of the nonaqueous electrolyte to outside can be lowered. In the case of the liquid nonaqueous electrolyte, on the other hand, the ion conductivity is higher than in the gel nonaqueous electrolyte, so that the high rate discharge characteristic and low temperature discharge characteristic of the nonaqueous electrolyte secondary battery can be enhanced.

The nonaqueous electrolyte is prepared, for example, in any one of the methods (I) to (VI) explained above.

Next, the nonaqueous solvent and electrode contained in the liquid nonaqueous electrolyte and gel nonaqueous electrolyte will be described below.

Various solvents for composing the nonaqueous solvent are explained.

a. γ-butyrolactone (GBL)

The GBL is low in reactivity with a positive electrode in the charged state, that is, in a state where potential of the positive electrode is high, and hence can suppress the decomposition reaction and pyrogenic reaction of the nonaqueous solvent in the charged state. The ratio (c) of GBL is preferred to be in a range of $10 < c \leq 50$ vol. %. The reason is as follows. If the ratio (c) of GBL is 10 vol. % or less, the gas generation amount is increased in an initial charging and in high-temperature long-term storage under the charged state. Increase of the gas generation amount leads to drop of initial charging and discharging efficiency. Further, if the gas generation amount is large, the case may be swollen and deformed in the case of the case made of a laminated film or thin sheet for the purpose of reducing the weight or thickness of the nonaqueous electrolyte secondary battery. On the other hand, if the ratio (c) of GBL exceeds 50 vol. %, the reactivity between the negative electrode surface and GBL becomes high in particular at high temperature, so that the decrease rate of the residual capacity when stored under high temperature environment in the charged state is increased, or the recovery capacity is lowered when recharged after high temperature storage.

A more preferred range of the ratio (c) of GBL is $10 < c \leq 45$ vol. %, and most preferred range of the ratio (c) is $10 < c \leq 40$ vol. % b. Cyclic Carbonate

The cyclic carbonate contains ethylene carbonate (EC) and propylene carbonate (PC) as essential components. The EC is capable of, without sacrificing the merits of the GBL, that is, the advantages of low solidifying point, high lithium ion conductivity, and excellent safety, suppressing the reaction of lithium ions intercalated in the carbonaceous material with the GBL. The PC is capable of enhancing the density of the protective film formed on the negative electrode surface, but if too much is present, it may cause to swell the battery case by the gas generated by the decomposition reaction in initial charging. However, such decomposition reaction can be suppressed by the presence of the sultone compound having at least one double bond in a ring and the GBL as described below. As a result, the effect of the PC for enhancing the density of the protective film is effectively applied, and the reaction of $Li^+$ and GBL and decomposition reaction of PC in initial charging can be suppressed. Therefore, as compared with the case of EC alone, the high-temperature long-term storage characteristic in charge state may be further enhanced.

The ratio (a) of EC in the total volume of the nonaqueous solvent is preferred to be in a range of 15 to 50 vol. %. If the ratio (a) of EC in the total volume of the nonaqueous solvent is less than 15 vol. %, reaction of the negative electrode and GBL cannot be suppressed under high temperature environment. On the other hand, if the EC ratio (a) is more than 50 vol. %, the viscosity of the nonaqueous electrolyte is enhanced, and the ion conductivity is lowered, and hence the low-temperature discharging characteristic drops.

A more preferred range of the EC ratio (a) is $15 \leq a \leq 45$ vol. %, and a further preferred ratio (a) is in a range of $20 \leq a \leq 45$ vol. %.

The ratio (b) of PC in the total volume of the nonaqueous solvent is preferred to be in a range of $20 < b \leq 70$ vol. %. If the ratio (b) of PC in the total volume of the nonaqueous solvent is 20 vol. % or less, the density of the protective film formed on the negative electrode surface cannot be heightened sufficiently, and the reaction of $Li^+$ and GBL and decomposition reaction of PC in initial charging cannot be suppressed, so that the residual capacity and recovery capacity after high-temperature long-term storage in a charge state are declined. On the other hand, if the PC ratio (b) is more than 70 vol. %, the reaction of the negative electrode and PC easily occurs in initial charging, making it hard to suppress gas generation in initial charging and its accompanying swelling of the battery case.

A more preferred range of the PC ratio (b) is $25 \leq b \leq 65$ vol. %, and a further preferred range of ratio (b) is $25 \leq b \leq 60$ vol. %.

Meanwhile, the PC immigrates from the nonaqueous solvent to the surface of the negative electrode during initial charging and discharging process, and sticks to the surface of the negative electrode. Therefore, in the nonaqueous solvent existing in the secondary battery after the initial charging and discharging process is applied, the rate of the PC in the entire nonaqueous solvent is decreased and is lower than before assembly of the secondary battery. The decrease rate is greater when the addition of PC is smaller.

c. Sultone Compound having a Ring having at Least one Double Bond

Herein, As the sultone compound having a ring having at least one double bond, either a sultone compound A expressed in chemical formula 1 given above, or a sultone compound B having at least one H of the sultone compound A replaced by a hydrocarbon group can be used. In the present invention, the sultone compound A or sultone compound B may be used either alone, or both sultone compound A and sultone compound B may be used together.

In the sultone compound having a double bond in a ring, the double bond is opened by the reducing reaction with the negative electrode to induce polymerization reaction, so that a dense protective film can be formed on the negative electrode surface. This protective film is high in lithium ion permeability, but is low in permeability of GBL molecules, and hence it is effective to suppress the reaction of lithium ions ($Li^+$) intercalated in the carbonaceous material of the negative electrode and the GBL. At the same time, this protective film can suppress the continuous decomposition reaction of the cyclic carbonate containing EC and PC. In particular, since the protective film can suppress the decomposition reaction of PC, even if the PC addition amount (b) is in a range of $20 < b \leq 70$ vol. % in order to enhance the high-temperature long-term storage characteristic in the charged state, it is possible to decrease the gas generation amount in initial charging.

A preferred sultone compound is a sultone compound A, in particular, a compound in which m=3 and n=4, that is, 1,3-propene sultone (PRS), or a compound in which m=4 and n=6, that is, 1,4-butylene sultone (BTS). Protective films derived from these compounds are highest in the effect of suppressing the reaction of $Li^+$ and GBL and the decomposition reaction of cyclic carbonate containing EC and PC. As the sultone compound, 1,3-propene sultone (PRS) or 1,4-butylene sultone (BTS) may be used alone, or both PRS and BTS may be used together.

The ratio (d) of the sultone compound is preferred to be 10 vol. % or less. That is, if the sultone compound ratio (d) exceeds 10 vol. %, the protective film becomes very thick and the lithium ion permeability is lowered, thereby the discharge capacity may be lowered. The sultone compound rate (d) is preferred to be 5 vol. % or less. Further, in order to assure enough forming amount of the protective film, the sultone compound ratio (d) is desirably at least 0.01 vol. %. Moreover, when the sultone compound ratio (d) is 0.1 vol. % or more, the protective function by the protective film is sufficient in a high temperature region.

d. Subsidiary Components

The nonaqueous solvent may contain solvents other than EC, PC, GBL, and sultone compound.

Subsidiary components include, for example, vinylene carbonate (VC), vinylethylene carbonate (VEC), phenylethylene carbonate (phEC), diethyl carbonate (DEC), dimethyl carbonate (DMC), ethyl methyl carbonate (EMC), γ-valerolactone (VL), methyl propionate (MP), ethyl propionate (EP), 2-methylfurane (2Me-F), furane (F), thiophene (TIOP), catechol carbonate (CATC), ethylene sulfite (ES), 12-crown-4 (Crown), tetraethylene glycol dimethyl ether (Ether), and 1,3-propane sultone (PS). As subsidiary components, one type may be used alone, or two or more types may be used together.

Above all, since a subsidiary component containing vinylene carbonate can enhance the density of the protective film of the negative electrode surface, it is possible to enhance further the long-term high-temperature storage characteristic in the charged state by using the subsidiary component, PC and the sultone compound.

The ratio (w) by volume of the subsidiary component in the nonaqueous solvent is preferred to be in a range of 10 vol. % or less. If the volume ratio (w) of the subsidiary component is more than 10 vol. %, the excess subsidiary component may be decomposed during long storage in the charged state, and the battery case may be swollen. A more preferred range of the volume ratio (w) of the subsidiary component is 0.01 to 5 vol. %.

The electrolyte to be dissolved in the nonaqueous solvent is, for example, a lithium salt such as lithium perchlorate ($LiClO_4$), lithium hexafluoro phosphate ($LiPF_6$), lithium tetrafluoro borate ($LiBF_4$), lithium hexafluoro arsenate (Li-$AsF_6$), lithium trifluoromethasulfonate ($LiCF_3SO_3$), bistrifluoromethyl sulfonylimide lithium [$(LiN(CF_3SO_2)_2]$, and $LiN(C_2F_5SO_2)_2$. One type, or two or more types of electrolytes may be used.

Above all, it is preferred to contain $LiPF_6$ or $LiBF_4$. Alternatively, by using a mixed salt A comprising an imide salt made of at least one of $LiN(CF_3SO_2)_2$ and $LiN(C_2F_5SO_2)_2$, and a salt made of at least one of $LiBF_4$ and $LiPF_6$, or a mixed salt B comprising $LiBF_4$ and $LiPF_6$, the thermal stability of the electrolyte is enhanced, so that it is effective to suppress voltage drop due to self-discharge during storage under high temperature environment. In particular, $LiBF_4$ is more preferable than $LiPF_6$. This is because the lithium salt containing $LiBF_4$ can lower the reactivity with the GBL as compared with the lithium salt composed of $LiPF_6$.

The dissolving amount of the electrolyte in the nonaqueous solvent is preferred to be 0.5 to 2.5 mol/L. A more preferred range is 1 to 2.5 mol/L.

To improve wettability with the separator, the liquid nonaqueous electrolyte is preferred to contain a surfactant such as trioctyl phosphate (TOP). The amount of addition of the surfactant is preferred to be 3% or less, or more preferably in a range of 0.1 to 1%.

The amount of the liquid nonaqueous electrolyte is preferred to be 0.2 to 0.6 g per 100 mAh of battery unit capacity. A more preferred range of the liquid nonaqueous electrolyte is 0.25 to 0.55 g/100 mAh.

The mode of the nonaqueous electrolyte secondary battery of the second embodiment according to the invention is not particularly specified, and it may be realized, for example, in the thin type as shown in FIGS. 1 and 2, prismatic type as shown in FIG. 3, cylindrical type as shown in FIG. 4, or coin type.

The nonaqueous electrolyte secondary battery of the second embodiment according to the invention described above is a nonaqueous electrolyte secondary battery comprising a positive electrode, a negative electrode including a carbonaceous material capable of intercalating and deintercalating lithium ions, and a nonaqueous electrolyte including a nonaqueous solvent. The nonaqueous solvent comprises cyclic carbonate including ethylene carbonate (EC) and propylene carbonate (PC), γ-butyrolactone (GBL), and a sultone compound having a ring having at least one double bond. The EC, PC, GBL, and sultone compound are, supposing a (vol. %), b (vol. %), c (vol. %), and d (vol. %) respectively, contained in the total volume of the nonaqueous solvent at the rate of $15 \leq a \leq 50$, $20 < b \leq 70$, $10 < c \leq 50$, and $0 < d \leq 10$.

According to such secondary battery, a protective film derived from the EC, PC, and sultone compound can be formed on the negative electrode surface. This protective film is excellent in lithium ion permeability, but is low in GBL molecule permeability, and therefore it can suppress the reaction of lithium ions ($Li^+$) intercalated in the carbonaceous material of the negative electrode and the GBL without sacrificing the discharge capacity of the secondary battery. As a result, it can suppress swelling of the battery due to gas generation in high temperature storage such as 65° C., and decrease of residual capacity in high temperature storage, and at the same time, the recovery capacity in recharging that is performed after high temperature storage is enhanced.

Since the protective film can suppress the continuous decomposition reaction of the cyclic carbonate including EC and PC, the gas generation amount in initial charging can be decreased.

Therefore, the gas generation amount in initial charging can be decreased, and a nonaqueous electrolyte secondary battery of high capacity and improved in high temperature storage characteristic at, for example, 65° C. can be realized.

Incidentally, the sultone compound is likely to form a protective film so as to cover the entire surface of the negative electrode. On the other hand, the vinylene carbonate (VC) is likely to form a film at the edge of the carbonaceous material. When the secondary battery includes the negative electrode containing a carbonaceous material such as a mesophase pitch-based carbon material or a mesophase pitch-based graphitized material, and the nonaqueous solvent containing the EC, PC, GBL, sultone compound and VC, the density of the protective film of the negative electrode surface can be enhanced without increasing the interface resistance of the negative electrode, and therefore the residual capacity and recovery capacity in high temperature storage of the secondary battery can be further enhanced.

A nonaqueous electrolyte secondary battery of a third embodiment according to the invention will be explained below.

The nonaqueous electrolyte secondary battery of the third embodiment according to the invention comprises an electrode group having a positive electrode and a negative electrode wound flatly by way of a separator, a positive electrode tab connected electrically to the positive electrode and projecting from the spiral surface of the electrode group, a negative electrode tab connected electrically to the negative electrode and projecting from the spiral surface, and a nonaqueous electrolyte. The nonaqueous electrolyte contains a sultone compound having a ring having at least one double bond.

The shortest distance between the positive electrode tab and the negative electrode tab is in a range of 6 mm to 18 mm.

Figure 6:
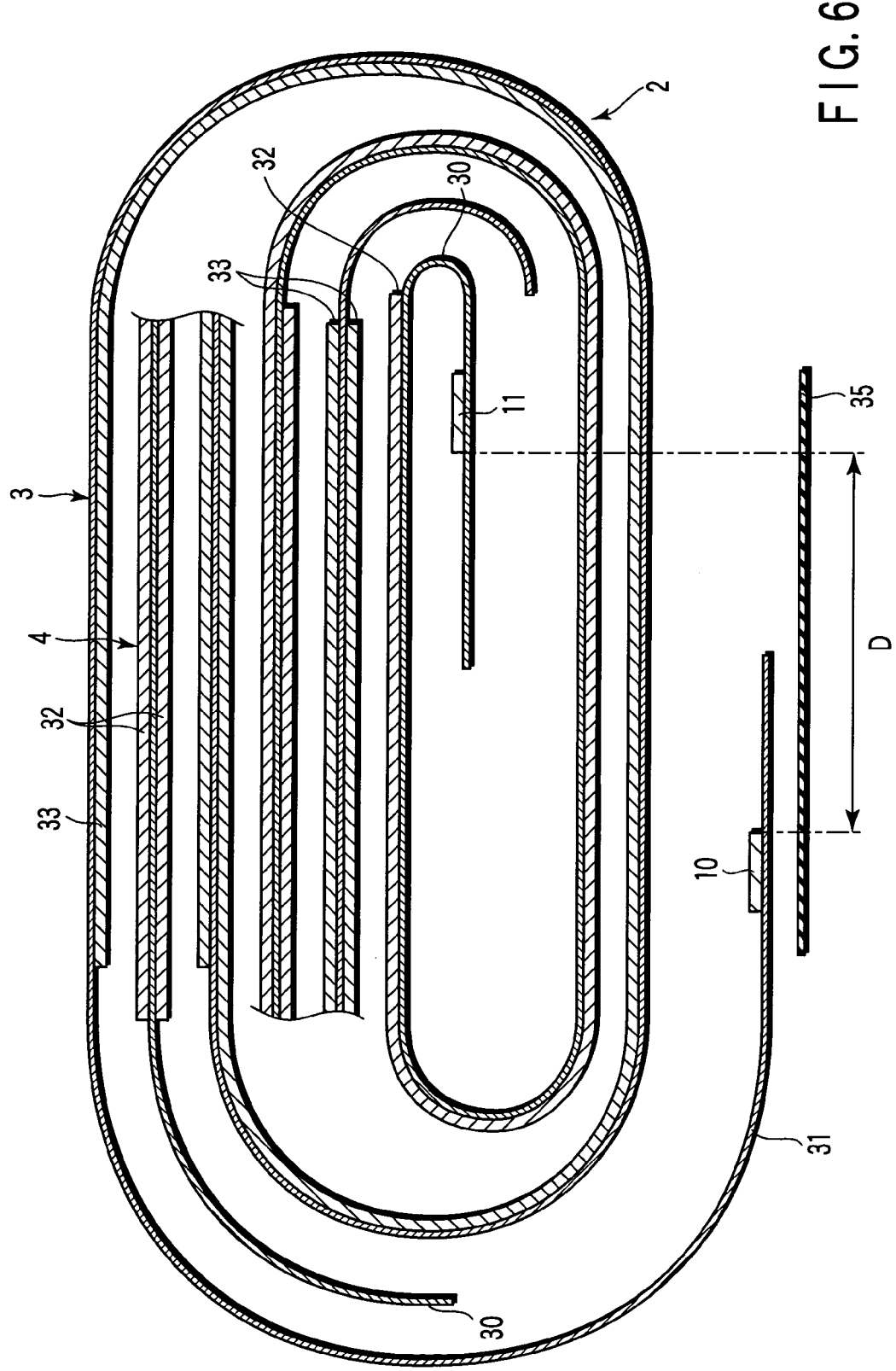
FIG. 6 is a cross sectional view showing another embodiment of the electrode group for use in the nonaqueous electrolyte secondary battery in FIG. 1 or FIG. 3.
Figure 7:
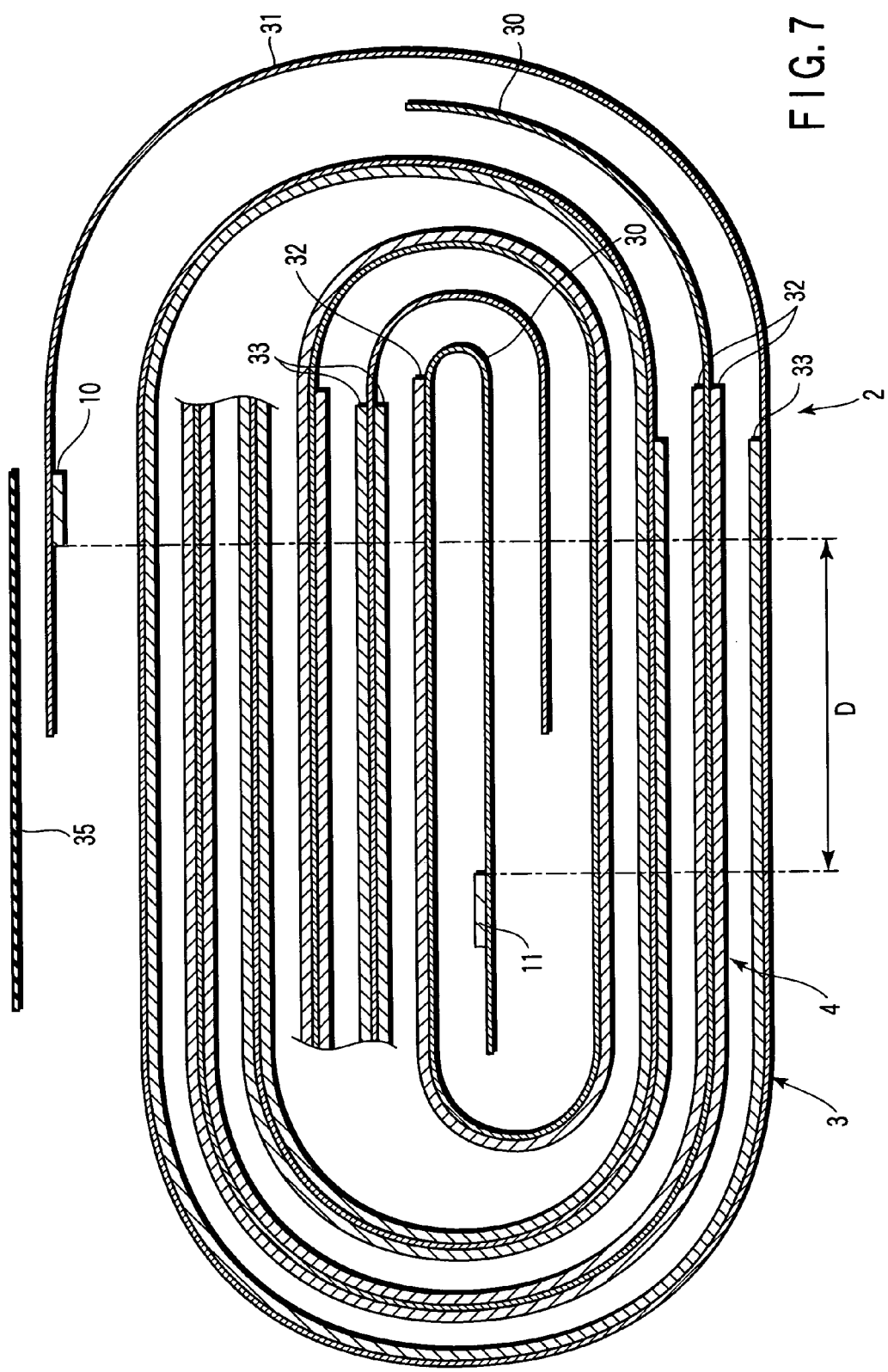
FIG. 7 is a cross sectional view showing a different embodiment of the electrode group for use in the nonaqueous electrolyte secondary battery in FIG. 1 or FIG. 3.

The mode of the nonaqueous electrolyte secondary battery of the third embodiment according to the invention is realized, for example, in the thin type as shown in FIGS. 1 and 2, or prismatic type as shown in FIG. 3. Embodiments of the flat electrode group used in this secondary battery are shown in FIGS. 5 to 7. In FIGS. 5 to 7, the separator is omitted for the sake of ease of understanding of the configuration of the positive electrode and negative electrode.

FIG. 5 shows one embodiment of inner-inner tabs in which both positive electrode tab 10 and negative electrode tab 11 are positioned near the center of the electrode group. An electrode group 2 is fabricated, for example, by interposing a separator between a positive electrode 3 and a negative electrode 4, and winding flatly. At this time, the negative electrode 4 is wound before the positive electrode 3 is wounded. The outermost circumference of the electrode group 2 is the positive electrode 3. In the winding start portion of a negative electrode current collector 30 of the negative electrode 4, a negative electrode layer is not provided, but a negative electrode tab 11 in a ribbon form is welded to the inner surface thereof. The winding start portion of a positive electrode current collector 31 of the positive electrode 3 is opposite to the winding start portion of the negative electrode 4 by way of a separator (not shown). Note that a positive electrode layer is not provided in the winding start portion. The positive electrode tab 10 is welded to the inner surface of the winding start portion of the positive electrode current collector 31.

In the negative electrode 4, in the first layer from the winding start portion, a negative electrode layer 32 is formed only on one surface of the negative electrode current collector 30, and thereafter the negative electrode layer 32 is formed on both surfaces of the negative electrode current collector 30. On the other hand, in the positive electrode 3, in the portion composing the outermost layer of the electrode group 2, a positive electrode layer 33 is formed only on one surface of the positive electrode current collector 31, and at the inner layers, the positive electrode layer 33 is formed on both surfaces of the positive electrode current collector 31.

A protective tape 34 for preventing short-circuit by the positive electrode tab covers the positive electrode tab 10 welded to the positive electrode current collector 31, and is glued to the back side of this weld zone. A winding fixing tape 35 of the electrode group 2 fixes the winding end portion of the electrode group to the outermost circumference of the electrode group. Incidentally, the protective tape 34 and winding fixing tape 35 may not always be necessary.

FIG. 5 shows a case where the tab is fitted to the winding start portion of the electrode, but the fitting position of the tab is not limited in the case of the inner-inner tab structure. The positive electrode tab 10 can be arranged at any position at layers positioned inside the outermost layer of the positive electrode 3 and positioned outside of the winding start portion of the positive electrode 3. On the other hand, the negative electrode tab 11 can be arranged at any position at layers positioned inside the outermost layer of the negative electrode 4 and positioned outside of the winding start portion of the negative electrode 4.

FIGS. 6 and 7 are embodiments of inner-outer tabs, that is, the positive electrode tab 10 is arranged at the outermost circumference of the electrode group, and the negative electrode tab 11 is positioned near the center of the electrode group.

In FIG. 6, the winding start portion of the negative electrode 4 is face to the winding start portion of the positive electrode 3. The winding start portion of the negative electrode 4 and the winding start portion of the positive electrode 3 are respectively formed of the current collector not holding the electrode layer. In the negative electrode 4, removing one layer from the winding start portion, the negative electrode layers 32 are formed on both surfaces of the negative electrode current collector 30. On the other hand, in the positive electrode 3, excluding the winding start portion of the positive electrode current collector 31, the positive electrode layer is provided, but on the outermost circumference of the electrode group, the positive electrode layer 33 is formed only on one surface of the positive electrode current collector 31, and the positive electrode layers 33 are formed on both surfaces of the positive electrode current collector 31 at the inner layers from the outermost circumference. The positive electrode tab 10 in a ribbon form is welded to the inner surface of the winding end portion of the positive electrode current collector 31. On the other hand, the negative electrode tab 11 in a ribbon form is welded to the inner surface of the winding start portion of the negative electrode current collector 30. FIG. 6 is one embodiment of left winding in an even number of layers, and FIG. 7 is one embodiment of left winding in an odd number of layers with the numbers of windings a half turn more than in FIG. 6.

In FIG. 7, the winding end portion of the positive electrode current collector 31 and the winding end portion of the negative electrode current collector 30 are positioned half turn behind from FIG. 6. The ribbon-shaped positive electrode tab 10 is welded to the inner surface of the winding end portion of the positive electrode current collector 31. On the other hand, the ribbon-shaped negative electrode tab 11 is welded to the inner surface of the winding start portion of the negative electrode current collector 30.

FIGS. 6 and 7 show embodiments in which the outermost circumference of the electrode group is the positive electrode, but alternatively the outermost circumference of the electrode group can be the negative electrode, and the negative electrode tab 11 can be arranged at the winding end portion of the negative electrode 4 and the positive electrode tab 10 can be arranged at the winding start portion of the positive electrode 3. Further, the outermost circumference of the electrode group can be the separator instead of the positive electrode or negative electrode.

FIGS. 6 and 7 explain one embodiment in which the tab of one electrode is arranged at the winding end portion of the same electrode, and the tab of the other electrode is arranged at the winding start of the same electrode, but the tab configuration for composing the inner-outer tabs is not limited. For example, the tab of one electrode maybe arranged at the outermost layer of the electrode, and the tab of the other electrode may be arranged at the layers positioned inside of the outermost layer of the same electrode.

FIGS. 5 to 7 explain one embodiment in which the positive electrode tab 10 and negative electrode tab 11 are welded to the positive electrode current collector 31 and negative electrode current collector 30, respectively, but not limited to this structure, part of the positive electrode current layer 31 may be extended and used as the positive electrode tab, and part of the negative electrode current layer 30 may be extended and used as the negative electrode tab.

In FIGS. 5 to 7, the inner-inner tab structure and inner-outer tab structure are shown, but the invention is not limited to these examples alone. For example, the outermost circumference of the electrode group is used as the positive electrode, the tab is arranged at the winding end portion of the positive electrode, the winding end portion of the negative electrode is extended from the winding end portion of the positive electrode, and the negative electrode tab is arranged at the winding end portion of the negative electrode, thereby composing an outer-outer tab structure. In this outer-outer tab structure, the outermost circumference of the electrode group may be used as the negative electrode, the negative electrode tab may be arranged at the winding end portion of the negative electrode, and the positive electrode tab may be arranged at the winding end portion of the positive electrode opposite to the negative electrode of the outermost circumference.

The positive electrode tab 10 can be formed of, for example, aluminum. The negative electrode tab 11 can be formed of, for example, nickel.

The shortest distance D between the positive electrode tab 10 and the negative electrode tab 11 is preferred to be in a range of 6 mm to 18 mm. The reason is as follows. If the shortest distance D is less than 6 mm, the positive electrode tab and negative electrode tab come closer to the center of the electrode group, so that the stress caused by expansion or shrinkage due to charging and discharging reaction tends to diffuse in the outward direction. However, since the outer shape of the electrode group is defined in a specific shape by the case, the stress diffusion is insufficient, so that one end of the electrode group is deviated from the other end, and it is deformed. On the other hand, if the shortest distance D is more than 18 mm, the positive electrode tab and negative electrode tab come closer to both ends of the electrode group, so that the stress caused by expansion or shrinkage due to charging and discharging reaction diffuses in the inward direction. As a result, the positive electrode and negative electrode near the center of the electrode group slide vertically, and the center of the electrode group is distorted. A more preferred range of the shortest distance D is 8 mm to 17 mm, and the most preferred range is 10 mm to 16 mm.

The width (shorter side width) of the positive electrode tab 10 and the width (shorter side width) of the negative electrode tab 11 are respectively preferred to be in a range of 2 mm to 5 mm. Further, when the positive electrode tab 10 is welded to the positive electrode current collector 31, the thickness of the positive electrode tab 10 can be defined in a range of 50 μm to 150 μm. When using part of the positive electrode current collector 31 as the positive electrode tab 10, the thickness of the positive electrode tab 10 is equal to the thickness of the positive electrode current collector 31 consequently. The thickness of the positive electrode current collector 31 can be, for example, in a range of 5 μm to 20 μm.

On the other hand, when the negative electrode tab 11 is welded to the negative electrode current collector 30, the thickness of the negative electrode tab 11 can be defined in a range of 50 μm to 150 μm. When using part of the negative electrode current collector 30 as the negative electrode tab 11, the thickness of the negative electrode tab 11 is equal to the thickness of the negative electrode current collector 30 consequently. The thickness of the negative electrode current collector 30 is, for example, in a range of 5 μm to 20 μm.

In the nonaqueous electrolyte secondary battery of the third embodiment, the positive electrode, negative electrode, separator and case may be same as those explained in nonaqueous electrolyte secondary battery of the first embodiment. The nonaqueous electrolyte will be explained below.

The nonaqueous electrolyte having a substantially liquid or gel form can be used.

The nonaqueous electrolyte is prepared, for example, in any one of the methods (I) to (VI) explained above.

The nonaqueous solvent and electrode contained in the liquid nonaqueous electrolyte and gel nonaqueous electrolyte are described below.

The nonaqueous solvent includes a sultone compound having a ring having at least one double bond.

Herein, as the sultone compound having a ring having at least one double bond, either a sultone compound A expressed in chemical formula 1 given above, or a sultone compound B having at least one H of the sultone compound A replaced by a hydrocarbon group can be used. In the present invention, the sultone compound A or sultone compound B may be used either alone, or both the sultone compound A and sultone compound B can be used together.

In the sultone compound having a double bond in a ring, the double bond is opened by the reducing reaction with the negative electrode to induce polymerization reaction, so that a protective film high in lithium ion permeability can be formed on the negative electrode surface. A preferred sultone compound is a sultone compound A, in particular, a compound in which m=3 and n=4, that is, 1,3-propene sultone (PRS), or a compound in which m=4 and n=6, that is, 1,4-butylene sultone (BTS). As the sultone compound, 1,3-propene sultone (PRS) or 1,4-butylene sultone (BTS) may be used alone, or both PRS and BTS may be used together.

The ratio of the sultone compound is preferred to be 10 vol. % or less. That is, if the sultone compound ratio exceeds 10 vol. %, since the adhesion of the electrode and separator is strong, diffusion of stress caused by expansion and shrinkage by charging and discharging is hindered, which may distort the electrode group. To prevent distortion of the electrode group for long charging and discharging cycles, the content of the sultone compound is preferred to be 4 vol. % or less. Further, in order to assure enough forming amount of the protective film, the sultone compound ratio is preferably at least 0.01 vol. %. Moreover, when the sultone compound ratio is 0.1 vol. % or more, the protective function by the protective film is sufficient at higher temperatures, for example, 65° C.

The nonaqueous solvent is further preferred to include ethylene carbonate (EC). The content of EC in the nonaqueous solvent is preferred to be in a range of 25 vol. % to 50 vol. %. As a result, a nonaqueous electrolyte of high conductivity and appropriate viscosity can be obtained. A further preferred EC content is in a range of 25 vol. % to 45 vol. %.

As the nonaqueous solvent, other solvents can be used together with sultone compound and EC. Other solvents include, for example, chain carbonate [such as methyl ethyl carbonate (MEC), diethyl carbonate (DEC), dimethyl carbonate (DMC)], vinylene carbonate (VC), vinylethylene carbonate (VEC), phenylethylene carbonate (phEC), propylene carbonate (PC), γ-butyrolactone (GBL), γ-valerolactone (VL), methyl propionate (MP), ethyl propionate (EP), 2-methylfurane (2Me-F), furane (F), thiophene (TIOP), catechol carbonate (CATC), ethylene sulfite (ES), 12-crown-4 (Crown), tetraethylene glycol dimethyl ether (Ether), and 1,3-propane sultone (PS). Such solvents may be used either alone or in combination of two or more types.

The electrolyte to be dissolved in the nonaqueous solvent is, for example, a lithium salt such as lithium perchlorate ($LiClO_4$), lithium hexafluoro phosphate ($LiPF_6$), lithium tetrafluoro borate ($LiBF_4$), lithium hexafluoro arsenate ($LiAsF_6$), lithium trifluoromethasulfonate ($LiCF_3SO_3$), bistrifluoromethyl sulfonylimide lithium [$(LiN(CF_3SO_2)_2$], and $LiN(C_2F_5SO_2)_2$. One type, or two or more types of electrolytes may be used.

The dissolving amount of the electrolyte in the nonaqueous solvent is preferred to be 0.5 to 2.5 mol/L. A more preferred range is 0.8 to 2 mol/L.

To improve wettability with the separator, the liquid nonaqueous electrolyte is preferred to contain a surfactant such as trioctyl phosphate (TOP). The amount of addition of the surfactant is preferred to be 3% or less, or more preferably in a range of 0.1 to 1%.

The amount of the liquid nonaqueous electrolyte is preferred to be 0.2 to 0.6 g per 100 mAh of battery unit capacity. A more preferred range of the liquid nonaqueous electrolyte is 0.25 to 0.55 g/100 mAh.

Since the nonaqueous electrolyte secondary battery of the third embodiment according to the invention comprises the nonaqueous electrolyte including a sultone compound having a ring having at least one double bond, a protective film is formed on the electrode surface, and the adhesion of the positive electrode and negative electrode with the separator is enhanced. As a result, if charging and discharging are repeated, the distance between the positive electrode and the negative electrode is not extended but is kept constant, so that charging and discharging are performed uniformly. Besides, since the shortest distance between the positive electrode tab and the negative electrode tab is defined in a range of 6 to 18 mm, the stress caused by expansion and shrinkage due to charging and discharging can be uniformly diffused in the electrode group, so that distortion in the electrode group is suppressed. Therefore, the increase of the thickness of the battery due to distortion in the electrode group can be suppress. As a result, the invention can provide a nonaqueous electrolyte secondary battery of a long charging and discharging cycle life.

In particular, when the nonaqueous electrolyte of the nonaqueous electrolyte secondary battery of the first or second embodiment is used, the gas generation amount in initial charging can be decreased, and expansion of the electrode distance and deformation of the electrode group due to gas existing between the electrodes and the separator can be avoided. As the deformation of the electrode group in initial charging is suppressed, the distortion of the electrode group by repetition of charging and discharging cycle can be further suppressed, so that the charging and discharging cycle life can be further extended.

Preferred examples of the invention are specifically described below while referring to the accompanying drawings.

EXAMPLE 1

<Fabrication of Positive Electrode>

To 90 wt. % of lithium cobalt oxide ($Li_xCoO_2$, $0<x\leq1$) powder, 5 wt. % of acetylene black and dimethyl formamide (DMF) solution of 5 wt. % of polyvinylidene fluoride (PVdF) were added and mixed, and a slurry was prepared. The slurry was applied on both surfaces of a current collector made of aluminum foil of 15 μm in thickness, and dried and pressed, and thereby a positive electrode was fabricated in a structure having positive electrode layers carried on both surfaces of the current collector. The thickness of the positive electrode layer was 60 μm at one side.

<Fabrication of Negative Electrode>

As a carbonaceous material, powder of mesophase pitch-based carbon fiber heated at 3000° C. (layer spacing ($d_{002}$) of (002) plane determined by powder X-ray diffraction being 0.336 nm) was used by 95 wt. %, and it was mixed with a dimethyl formamide (DMF) solution of 5 wt. % of polyvinylidene fluoride (PVdF), and a slurry was prepared. The slurry was applied on both surfaces of a current collector made of copper foil of 12 μm in thickness, and dried and pressed, and thereby a negative electrode was fabricated in a structure having negative electrode layers carried on both surfaces of the current collector. The thickness of the negative electrode layer was 55 μm at one side.

The layer spacing $d_{002}$ Of (002) plane of a carbonaceous material was determined by FWHM (full width at half-maximum) middle point method from the powder X-ray diffraction spectrum. At this time, scatter such as Lorentz scatter was not corrected.

<Separator>

A separator made of a microporous polyethylene film of 25 μm in thickness was prepared.

<Preparation of Nonaqueous Electrolysis Solution>

Ethylene carbonate (EC), propylene carbonate (PC), and 1,3-propene sultone (PRS) were mixed by a volume ratio (EC:PC:PRS) of 49:49:2, and a nonaqueous solvent was prepared. In the obtained nonaqueous solvent, lithium hexafluoro phosphate ($LiPF_6$) was dissolved to a concentration of 1.0 mol/L, and a liquid nonaqueous electrolyte was prepared.

<Fabrication of Electrode Group>

A positive electrode lead made of ribbon-shaped aluminum foil having a thickness of 100 μm was ultrasonically welded to the current collector of the positive electrode, and a negative electrode lead made of ribbon-shaped nickel foil having a thickness of 100 μm was ultrasonically welded to the current collector of the negative electrode. Thereafter, a separator was interposed between the positive electrode and the negative electrode, and then they were wound spirally and formed flatly to fabricate an electrode group.

A laminate film of 100 μm in thickness having both sides of an aluminum foil coated with polyethylene was pressed to form a rectangular cup, and the electrode group was put into this obtained case.

The electrode group in the case was dried in vacuum for 12 hours at 80° C. to remove moisture contained in the electrode group and laminate film.

The liquid nonaqueous electrolyte was poured into the electrode group in the case by 4.8 g per 1 Ah of battery capacity, and the case was sealed by heat seal. Thereby, a thin type nonaqueous electrolyte secondary battery of 3.6 mm in thickness, 35 mm in width, and 62 mm in height, having a structure as shown in FIGS. 1 and 2 was assembled.

EXAMPLES 2 TO 33

Thin type nonaqueous electrolyte secondary batteries were manufactured in the same manner as in Example 1, except that the composition of the nonaqueous solvent, type of the electrolyte, and electrolyte concentration were set as shown in Tables 1 to 3.

EXAMPLE 34

In a nonaqueous solvent having the same composition as in Example 1, lithium tetrafluoro borate ($LiBF_4$) and lithium hexafluoro phosphate ($LiPF_6$) were dissolved to a concentration of 0.2 mol/L ($LiBF_4$) and 1.0 mol/L ($LiPF_6$) respectively, and a liquid nonaqueous electrolyte was prepared.

A thin type nonaqueous electrolyte secondary battery was prepared in the same manner as in Example 1, except that the above liquid nonaqueous electrolyte was used.

EXAMPLE 35

In a nonaqueous solvent having the same composition as in Example 10, lithium tetrafluoro borate ($LiBF_4$) and lithium hexafluoro phosphate ($LiPF_6$) were dissolved to a concentration of 0.2 mol/L ($LiBF_4$) and 1.0 mol/L ($LiPF_6$) respectively, and a liquid nonaqueous electrolyte was prepared.

A thin type nonaqueous electrolyte secondary battery was prepared in the same manner as in Example 1, except that the above liquid nonaqueous electrolyte was used.

EXAMPLE 36

In a nonaqueous solvent having the same composition as in Example 1, $LiPF_6$ and $LiN(C_2F_5SO_2)_2$ were dissolved to a concentration of 1.0 mol/L ($LiPF_6$) and 0.2 mol/L [$LiN(C_2F_5SO_2)_2$] respectively, and a liquid nonaqueous electrolyte was prepared.

A thin type nonaqueous electrolyte secondary battery was prepared in the same manner as in Example 1, except that the above liquid nonaqueous electrolyte was used.

EXAMPLE 37

In a nonaqueous solvent having the same composition as in Example 10, $LiPF_6$ and $LiN(C_2F_5SO_2)_2$ were dissolved to a concentration of 1.0 mol/L ($LiPF_6$) and 0.2 mol/L [$LiN(C_2F_5SO_2)_2$] respectively, and a liquid nonaqueous electrolyte was prepared.

A thin type nonaqueous electrolyte secondary battery was prepared in the same manner as in Example 1, except that the above liquid nonaqueous electrolyte was used.

COMPARATIVE EXAMPLES 1 to 7

Thin type nonaqueous electrolyte secondary batteries were manufactured in the same manner as in Example 1, except that the composition of the nonaqueous solvent, type of the electrolyte, and electrolyte concentration were set as shown in Table 4

COMPARATIVE EXAMPLE 8

A thin type nonaqueous electrolyte secondary battery was manufactured in the same manner as in Example 1, except that metal lithium was used instead of the carbonaceous material as negative electrode active material, and that the composition of the nonaqueous solvent, type of the electrolyte, and electrolyte concentration were set as shown in Table 4

COMPARATIVE EXAMPLE 9

A thin type nonaqueous electrolyte secondary battery was manufactured in the same manner as in Example 1, except that metal lithium was used instead of the carbonaceous material as the negative electrode active material.

In the secondary batteries obtained in Examples 1 to 37 and Comparative examples 1 to 9, the initial charging and discharging efficiency, initial capacity, and swelling rate in initial charging were measured in the following methods, and the results are shown in Tables 1 to 4.

(Initial Charging and Discharging Efficiency and Initial Capacity)

The nonaqueous electrolyte secondary batteries assembled in the specified methods were initially charged for 15 hours at room temperature by charging at constant current and constant voltage up to 4.2 V at 0.2 C (130 mA). The initial charging capacity at this time is X (mAh). The batteries were then discharged at room temperature to 3.0 V at 0.2 C.

After such initial charging and discharging, the batteries were charged for 3 hours at room temperature at constant current and constant voltage up to 4.2 V at 1 C (650 mA), and discharged at room temperature to 3.0 V at 0.2 C, and initial capacity Y (mAh) was obtained. Using the obtained initial charging capacity X (mAh) and initial capacity Y (mAh), the initial charging and discharging efficiency was calculated in the following formula (1), and the results are shown in Tables 1 to 4. The initial capacity Y (mAh) is also recorded in Tables 1 to 4.

$$\text{Initial charging and discharging efficiency (\%)} = (Y/X) \times 100 \quad (1)$$

(Thickness Increase Rate in Initial Charging)

The assembled nonaqueous electrolyte secondary batteries were initially charged for 15 hours at room temperature by charging at constant current and constant voltage up to 4.2 V at 0.2 C (130 mA). In 1 hour after the initial charging process, the thickness of the battery case was measured, and the thickness increase rate in initial charging was determined in the following formula (2):

$$\text{Thickness increase rate in initial charging (\%)} = \{(T_1 - T_0)/T_0\} \times 100 \quad (2)$$

where $T_0$ is the thickness of the battery case immediately before initial charging, and $T_1$ is the thickness of the battery case 1 hour after initial charging.

Herein, the unit 1C is a current value required for charging a nominal capacity (Ah) in 1 hour. Hence, 0.2 C is the current value required for discharging the nominal capacity (Ah) in 5 hours.

In Tables 1 to 4, BTS is 1,4-butylene sultone, VC is vinylene carbonate, DEC is diethyl carbonate, GBL is γ-butyrolactone, PS is propane sultone, and MEC is methyl ethyl carbonate.

TABLE 1

| | Composition of nonaqueous solvent (% is vol. %) | Electrolyte/ electrolyte concentration | Capacity (Ah) | Initial charging and discharging efficiency (%) | Initial charging swell (%) | 3C discharge rate characteristic (%) |
|---|---|---|---|---|---|---|
| Example 1 | 49% EC, 49% PC, 2% PRS | LiPF$_6$/1.0 mol/L | 0.65 | 91 | 9 | 77 |
| Example 2 | 49% EC, 49% PC, 2% PRS | LiBF$_4$/1.5 mol/L | 0.65 | 91 | 9 | 55 |
| Example 3 | 32.6% EC, 65.4% PC, 2% PRS | LiPF$_6$/1.0 mol/L | 0.65 | 91 | 11 | 73 |
| Example 4 | 20% EC, 78% PC, 2% PRS | LiPF$_6$/1.0 mol/L | 0.63 | 88 | 13 | 67 |
| Example 5 | 60% EC, 38% PC, 2% PRS | LiPF$_6$/1.0 mol/L | 0.64 | 89 | 9 | 73 |
| Example 6 | 47.5% EC, 47.5% PC, 5% PRS | LiPF$_6$/1.0 mol/L | 0.63 | 88 | 9 | 65 |
| Example 7 | 45% EC, 45% PC, 10% PRS | LiPF$_6$/1.0 mol/L | 0.62 | 87 | 9 | 50 |
| Example 8 | 50% EC, 49.99% PC, 0.01% PRS | LiPF$_6$/1.0 mol/L | 0.62 | 87 | 14 | 47 |
| Example 9 | 49.95% EC, 49.95% PC, 0.1% PRS | LiPF$_6$/1.0 mol/L | 0.63 | 88 | 13 | 52 |
| Example 10 | 49% EC, 49% PC, 2% BTS | LiPF$_6$/1.0 mol/L | 0.65 | 90 | 9 | 75 |
| Example 11 | 49% EC, 49% PC, 2% BTS | LiBF$_4$/1.5 mol/L | 0.65 | 90 | 9 | 53 |
| Example 12 | 32.6% EC, 65.4% PC, 2% BTS | LiPF$_6$/1.0 mol/L | 0.65 | 91 | 11 | 71 |
| Example 13 | 20% EC, 78% PC, 2% BTS | LiPF$_6$/1.0 mol/L | 0.64 | 89 | 13 | 65 |
| Example 14 | 60% EC, 38% PC, 2% BTS | LiPF$_6$/1.0 mol/L | 0.64 | 90 | 9 | 70 |
| Example 15 | 47.5% EC, 47.5% PC, 5% BTS | LiPF$_6$/1.0 mol/L | 0.63 | 87 | 9 | 63 |

TABLE 2

| | Composition of nonaqueous solvent (% is vol. %) | Electrolyte/ electrolyte concentration | Capacity (Ah) | Initial charging and discharging efficiency (%) | Initial charging swell (%) | 3C discharge rate characteristic (%) |
|---|---|---|---|---|---|---|
| Example 16 | 45% EC, 45% PC, 10% BTS | LiPF$_6$/1.0 mol/L | 0.62 | 86 | 9 | 46 |
| Example 17 | 49.95% EC, 49.95% PC, 0.1% BTS | LiPF$_6$/1.0 mol/L | 0.64 | 89 | 13 | 43 |
| Example 18 | 49% EC, 49% PC, 1% PRS, 1% BTS | LiPF$_6$/1.0 mol/L | 0.65 | 91 | 9 | 79 |
| Example 19 | 47.5% EC, 47.5% PC, 2.5% PRS, 2.5% BTS | LiPF$_6$/1.0 mol/L | 0.64 | 90 | 9 | 63 |
| Example 20 | 45% EC, 45% PC, 5% PRS, 5% BTS | LiPF$_6$/1.0 mol/L | 0.63 | 88 | 9 | 48 |
| Example 21 | 49.95% EC, 49.95% PC, 0.05% PRS, 0.05% BTS | LiPF$_6$/1.0 mol/L | 0.65 | 91 | 11 | 50 |
| Example 22 | 47.5% EC, 47.5% PC, 2% PRS, 3% GBL | LiPF$_6$/1.0 mol/L | 0.65 | 91 | 9 | 87 |
| Example 23 | 47.5% EC, 47.5% PC, 2% BTS, 3% GBL | LiPF$_6$/1.0 mol/L | 0.65 | 91 | 9 | 84 |
| Example 24 | 47.5% EC, 47.5% PC, 2% PRS, 3% GBL | LiBF$_4$/1.5 mol/L | 0.65 | 91 | 9 | 63 |
| Example 25 | 48.95% EC, 48.95% PC, 2% PRS, 0.1% GBL | LiPF$_6$/1.0 mol/L | 0.65 | 91 | 9 | 82 |

TABLE 2-continued

|  | Composition of nonaqueous solvent (% is vol. %) | Electrolyte/ electrolyte concentration | Capacity (Ah) | Initial charging and discharging efficiency (%) | Initial charging swell (%) | 3C discharge rate characteristic (%) |
|---|---|---|---|---|---|---|
| Example 26 | 46.5% EC, 46.5% PC, 2% PRS, 5% GBL | LiPF$_6$/1.0 mol/L | 0.65 | 91 | 9 | 85 |
| Example 27 | 44% EC, 44% PC, 2% PRS, 10% GBL | LiPF$_6$/1.0 mol/L | 0.64 | 90 | 9 | 83 |
| Example 28 | 48.5% EC, 48.5% PC, 2% PRS, 1% VC | LiPF$_6$/1.0 mol/L | 0.65 | 91 | 10 | 85 |
| Example 29 | 48.5% EC, 48.5% PC, 2% BTS, 1% VC | LiPF$_6$/1.0 mol/L | 0.65 | 91 | 10 | 81 |
| Example 30 | 48% EC, 48% PC, 2% PRS, 2% DEC | LiPF$_6$/1.0 mol/L | 0.65 | 91 | 11 | 84 |

TABLE 3

|  | Composition of nonaqueous solvent (% is vol. %) | Electrolyte/ electrolyte concentration | Capacity (Ah) | Initial charging and discharging efficiency (%) | Initial charging swell (%) | 3C discharge rate characteristic (%) |
|---|---|---|---|---|---|---|
| Example 31 | 48% EC, 49% PC, 2% BTS, 2% DEC | LiPF$_6$/1.0 mol/L | 0.65 | 91 | 11 | 79 |
| Example 32 | 47% EC, 47% PC, 2% PRS, 3% GBL, 1% VC | LiPF$_6$/1.0 mol/L | 0.65 | 91 | 10 | 89 |
| Example 33 | 47% EC, 47% PC, 2% BTS, 3% GBL, 1% VC | LiPF$_6$/1.0 mol/L | 0.65 | 91 | 9 | 86 |
| Example 34 | 49% EC, 49% PC, 2% PRS | LiPF$_6$/1.0 mol/L LiBF$_4$/0.2 mol/L | 0.65 | 91 | 9 | 86 |
| Example 35 | 49% EC, 49% PC, 2% BTS | LiPF$_6$/1.0 mol/L LiBF$_4$/0.2 mol/L | 0.65 | 91 | 9 | 83 |
| Example 36 | 49% EC, 49% PC, 2% PRS | LiPF$_6$/1.0 mol/L LiN(C$_2$F$_5$SO$_2$)$_2$/0.2 mol/L | 0.65 | 91 | 9 | 87 |
| Example 37 | 49% EC, 49% PC, 2% BTS | LiPF$_6$/1.0 mol/L LiN(C$_2$F$_5$SO$_2$)$_2$/0.2 mol/L | 0.65 | 91 | 9 | 85 |

TABLE 4

|  | Composition of nonaqueous solvent (% is vol. %) | Electrolyte/ electrolyte concentration | Capacity (Ah) | Initial charging and discharging efficiency (%) | Initial charging swell (%) |
|---|---|---|---|---|---|
| Comparative example 1 | 50% EC, 50% PC, | LiPF$_6$/1.0 mol/L | 0.35 | 10 | 248 |
| Comparative example 2 | 42% EC, 42% PC, 16% PRS | LiPF$_6$/1.0 mol/L | 0.45 | 60 | 9 |
| Comparative example 3 | 48.5% EC, 48.5% PC, 3% GBL | LiPF$_6$/1.0 mol/L | 0.42 | 56 | 23 |
| Comparative example 4 | 49% EC, 49% PC, 2% PS | LiPF$_6$/1.0 mol/L | 0.56 | 80 | 23 |
| Comparative example 5 | 33.3% EC, 66.7% MEC | LiPF$_6$/1.0 mol/L | 0.65 | 89 | 31 |
| Comparative example 6 | 98% PC, 2% PRS | LiPF$_6$/1.0 mol/L | 0.10 | 5 | 100 |
| Comparative example 7 | 49% EC, 49% PC, 2% VC | LiPF$_6$/1.0 mol/L | 0.45 | 50 | 63 |
| Comparative example 8 (metal Li) | 50% EC, 50% PC, | LiPF$_6$/1.0 mol/L | 0.20 | 10 | 14 |
| Comparative example 9 (metal Li) | 49% EC, 49% PC, 2% PRS | LiPF$_6$/1.0 mol/L | 0.35 | 18 | 11 |

As clear from Tables 1 to 4, the secondary batteries in Examples 1 to 9 comprising the nonaqueous solvent including 15 to 60 vol. % of EC, 35 to 85 vol. % of PC, and 10 vol. % or less of PRS are smaller in swelling of the battery case in initial charging and higher in initial charging and discharging efficiency and initial capacity as compared with Comparative example 1 containing no sultone compound. On the other hand, in Comparative example 2 containing 16 vol. % of PRS, the swelling rate in initial charging is similar to that in Example 1, but the initial charging and discharging efficiency and initial capacity are lower.

As for the addition amount of PRS, it is also known from Tables 1 to 4 that a high initial charging and discharging efficiency is obtained when contained in a range of 0.1 to 4 vol. %.

As clarified also from Tables 1 to 4, if BTS is used instead of PRS, or mixture of BTS and PRS is used, as in Examples 10 to 21, same effects as in the case of PRS alone are obtained.

By contrast, second batteries of Comparative examples 3 and 7 comprising a nonaqueous solvent composed of three components, that is, EC, PC and GBL or EC, PC and VC are low, about 50%, in the initial charging and discharging efficiency, and also low, about 0.4 Ah, in the initial capacity, and large in swelling in initial charging. The secondary battery of Comparative example 4 using a sultone compound having no double bond, such as propane sultone (PS), and the secondary battery of Comparative example 5 having a nonaqueous solvent composed of EC and MEC are high in initial charging and discharging efficiency, but large in swelling in initial charging. The secondary battery of Comparative example 6 having a nonaqueous solvent composed of PC and PRS is extremely lower in the initial charging and discharging efficiency.

A sultone compound is added in the nonaqueous solvent of the secondary battery of Comparative example 9 using a negative electrode composed of metal lithium, but the initial charging and discharging efficiency is extremely low at 18%. This is estimated because the negative electrode composed of metal lithium is extremely higher in reactivity to GBL as compared with the negative electrode containing carbonaceous material, so that the protective film derived from EC, PC and sultone compound cannot efficiently suppress the reaction of the negative electrode and PC and EC.

In the secondary batteries of Examples 1 to 37, the 3C discharge rate characteristic was measured in the following method, and results are shown also in Tables 1 to 3.

The secondary batteries in Examples 1 to 37 were charged for 3 hours at 20° C. by charging at constant current and constant voltage up to 4.2 V at 1C (650 mA), and then discharged at constant current to 3.0 V at 1C, and the discharge capacity M (mAh) was measured. Thereafter, the secondary batteries were further charged for 3 hours by charging at constant current and constant voltage up to 4.2 V at 1C, and then discharged at constant current to 3.0 V at 3C (1950 mA), and the discharge capacity N (mAh) was measured. Using the obtained 1C discharge capacity M (mAh) and 3C discharge capacity N (mAh), the 3C rate capacity maintenance rate was calculated in the following formula (3), and the results are shown in Tables 1 to 3.

$$3C \text{ rate capacity maintenance rate } (\%) = (N/M) \times 100 \quad (3)$$

These results disclosed the following.

a) In the nonaqueous solvent in Examples 1 to 7 containing EC, PC and PRS, Examples 1 to 6 of which PRS content is 5 vol. % or less are higher in the 3C discharge rate characteristic as compared with Example 7 of which PRS content is 10 vol. %. If the PRS content is the same, Example 1 using $LiPF_6$ as the electrolyte is higher in the 3C discharge rate characteristic as compared with Example 2 using $LiBF_4$.

b) As clear from the fact that the higher discharge rate characteristic is obtained in the secondary battery of Example 24 as compared with the secondary battery of Example 2, the 3C discharge rate characteristic is heightened when GBL, VC or DEC is added to the nonaqueous solvent containing EC, PC and PRS or EC, PC and BTS. In particular, the secondary battery of Example 32 containing both VC and GBL has a higher 3C discharge rate characteristic as compared with Example 22 and 28 in which VC or GBL is added. A similar tendency is noted in comparison between Example 33 and Example 23 or 29. To enhance the discharge rate characteristic, it is preferred to use $LiPF_6$ as the electrolyte and use PRS as the sultone compound.

c) In Examples 34 to 37 using the mixed salt A or mixed salt B, a high 3C discharge rate characteristic of 80% or more is obtained.

EXAMPLE 38

Mixing polyethylene glycol diacrylate (molecular weight 1000) and liquid nonaqueous electrolyte same as explained in Example 1 at a rate of 1:10 by weight, 5000 ppm of t-hexyl peroxy pivalate was added as a thermal polymerization initiator, and a pregel solution was prepared.

An electrode group was fabricated in the same manner as in Example 1, the electrode group was put in a case, and dried in vacuum, and then the pregel solution was poured in by 5.2 g per 1 Ah of battery capacity. After sealing by heat seal, by heating for 3 hours at 60° C., the pregel solution was polymerized and crosslinked to form a gel nonaqueous electrolyte, and a thin type nonaqueous electrolyte secondary battery was obtained.

EXAMPLE 39

A thin type nonaqueous electrolyte secondary battery was obtained in the same manner as in Example 38, except that the same liquid nonaqueous electrolyte as in Example 3 was used instead of the liquid nonaqueous electrolyte of Example 1.

COMPARATIVE EXAMPLES 10 and 11

Thin type nonaqueous electrolyte secondary batteries were manufactured in the same manner as in Examples 38 and 39, except that 1,3-propene sultone was not added in the pregel solution.

In the secondary batteries obtained in Examples 38 and 39 and Comparative examples 10 and 11, the initial capacity, initial charging and discharging efficiency, and swelling in initial charging were evaluated in the same condition as explained in Example 1, and results are shown in Table 5.

TABLE 5

| | Composition of nonaqueous solvent (% is vol. %) | Electrolyte/ electrolyte concentration | Capacity (Ah) | Initial charging and discharging efficiency (%) | Initial charging swell (%) |
|---|---|---|---|---|---|
| Example 38 | 49% EC, 49% PC, 2% PRS | $LiPF_6$/1.0 mol/L | 0.64 | 89 | 8 |
| Comparative example 10 | 50% EC, 50% PC, | $LiPF_6$/1.0 mol/L | 0.39 | 25 | 25 |
| Example 39 | 32.6% EC, 65.4% PC, 2% PRS | $LiPF_6$/1.0 mol/L | 0.63 | 88 | 9 |
| Comparative example 11 | 33.3% EC, 66.7% EC | $LiPF_6$/1.0 mol/L | 0.30 | 20 | 30 |

As clear from Table 5, between Example 38 and Comparative example 10, there is a characteristic difference same as observed between Example 1 and Comparative example 1, and it is found that the effect of addition of the sultone compound having a double bond, such as PRS, is also obtained in the gel nonaqueous electrolyte. The same holds true between Example 39 and Comparative example 11.

(Method of Detecting PRS and VC)

Figure 8:
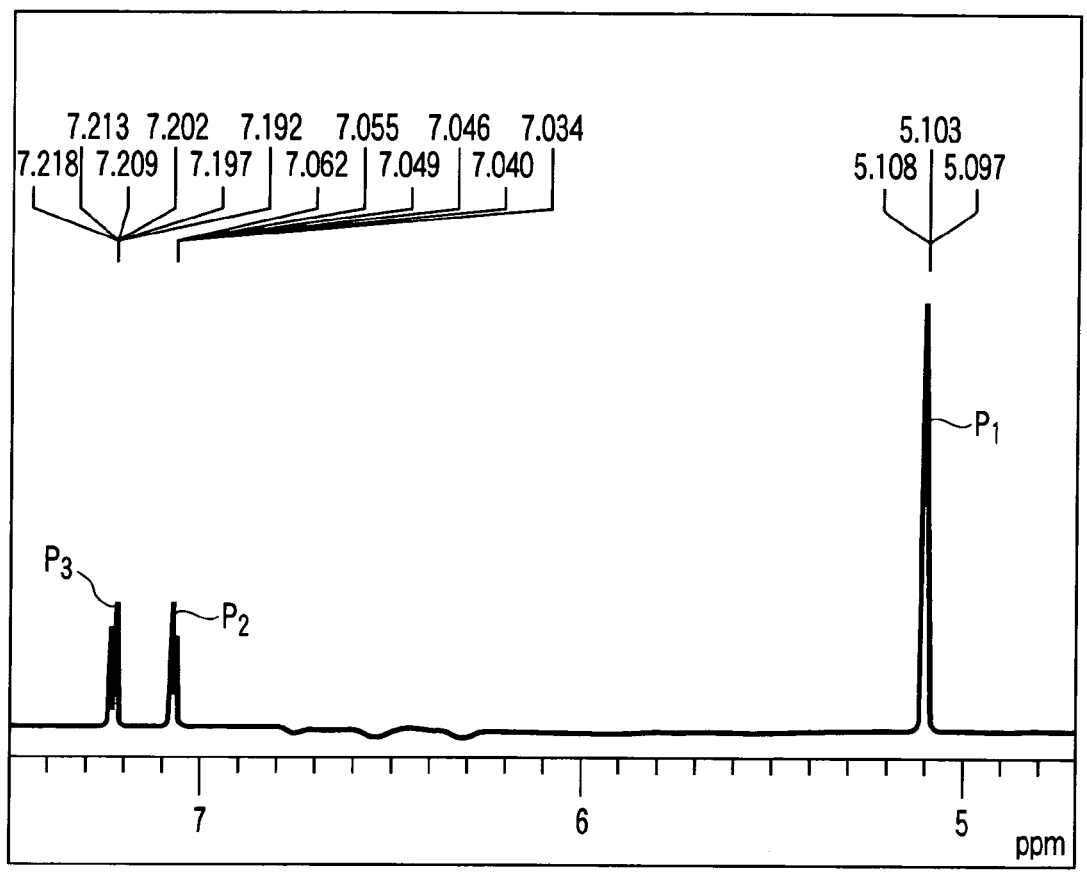
FIG. 8 is a characteristic diagram showing $^1$HNMR spectrum about PRS contained in a nonaqueous electrolyte in a nonaqueous electrolyte secondary battery in Example 28.

In the secondary battery of Example 28, after the initial charging and discharging process, the potential was sufficiently stabilized by opening the circuit for 5 hours or more, it was decomposed in a glove box at Ar concentration of 99.9% or more and dew point of −50° C. or less, and the electrode group was taken out. The electrode group was put into a centrifugal settling tube, dimethyl sulfoxide (DMSO)-$d_6$ was added to seal, and it was taken out from the glove box, and separated centrifugally. In the glove box, a mixed solution of the electrolyte and DMSO-$d_6$ was sampled from the centrifugal settling tube. The mixed solution was poured into an NMR test tube of 5 mm in diameter by about 0.5 ml, and the NMR measurement was carried out. An apparatus used in the NMR measurement was model JNM-LA400WB of JEOL Ltd., the observation nucleus was $^1H$, the observation frequency was 400 MHz, and the residual proton signal slightly contained in the dimethyl sulfoxide (DMSO)-$d_6$ was used as internal standard (2.5 ppm). The measuring temperature was 25° C. In the $^1H$ NMR spectrum, the peak corresponding to EC was observed around 4.5 ppm, and the peak corresponding to VC, around 7.7 ppm. On the other hand, the peak corresponding to PRS was observed around 5.1 ppm ($P_1$), around 7.05 ppm ($P_2$), and around 7.2 ppm ($P_3$) as shown in FIG. 8. It was confirmed from these results that VC and PRS were contained in the nonaqueous solvent in the secondary battery in Example 28 after the initial charging and discharging process.

Further, at the observation frequency of 100 MHz, $^{13}C$ NMR was measured by using dimethyl sulfoxide (DMSO)-$d_6$ (39.5 ppm) as an internal standard substance, and the peak corresponding to EC was observed around 66 ppm, the peak corresponding to VC around 133 ppm, and the peak corresponding to PRS around 74 ppm, around 124 ppm, and around 140 ppm. It was also confirmed from these results that VC and PRS were contained in the nonaqueous solvent in the secondary battery in Example 28 after the initial charging and discharging process.

Moreover, when in the $^1H$ NMR spectrum, the ratio of the NMR integral intensity of VC to the NMR integral intensity of EC, and the ratio of the NMR integral intensity of PRS to the NMR integral intensity of EC were determined, it was confirmed that both the VC rate and PRS rate in the entire nonaqueous solvent were decreased from before assembly of the secondary battery.

EXAMPLE 40

<Fabrication of Positive Electrode>

To 90 wt. % of lithium cobalt oxide ($Li_xCoO_2$, 0<x≦1) powder, 5 wt. % of acetylene black and dimethyl formamide (DMF) solution of 5 wt. % of polyvinylidene fluoride (PVdF) were added and mixed, and a slurry was prepared. The slurry was applied on both surfaces of a current collector made of aluminum foil of 15 μm in thickness, and dried and pressed, and thereby a positive electrode was fabricated in a structure having positive electrode layers carried on both surfaces of the current collector. The thickness of the positive electrode layer was 60 μm at one side.

<Fabrication of Negative Electrode>

As a carbonaceous material, powder of mesophase pitch-based carbon fiber heated at 3000° C. (layer spacing ($d_{002}$) of (002) plane determined by powder X-ray diffraction being 0.336 nm) was used by 95 wt. %, and it was mixed with a dimethyl formamide (DMF) solution of 5 wt. % of polyvinylidene fluoride (PVdF), so that a slurry was prepared. The slurry was applied on both surfaces of a current collector made of copper foil of 12 μm in thickness, and dried and pressed, and thereby a negative electrode was fabricated in a structure having negative electrode layers carried on both surfaces of the current collector. The thickness of the negative electrode layer was 55 μm at one side.

The layer spacing $d_{002}$ Of (002) plane of the carbonaceous material was determined by FWHM (full width at half-maximum) middle point method from the powder X-ray diffraction spectrum. At this time, scatter such as Lorentz was not corrected.

<Separator>

A separator made of a microporous polyethylene film of 25 μm in thickness was prepared.

<Preparation of Nonaqueous Electrolysis Solution>

Ethylene carbonate (EC), propylene carbonate (PC), γ-butyrolactone (GBL), and 1,3-propene sultone (PRS) were mixed by a volume ratio (EC:PC:GBL:PRS) of 33:33:33:1, and a nonaqueous solvent was prepared.

In the obtained nonaqueous solvent, lithium tetrafluoro borate ($LiBF_4$) was dissolved to a concentration of 1.5 mol/L, and a liquid nonaqueous electrolyte was prepared.

<Fabrication of Electrode Group>

A positive electrode lead made of ribbon-shaped aluminum foil (thickness 100 μm) was ultrasonically welded to the current collector of the positive electrode, and a negative electrode lead made of ribbon-shaped nickel foil (thickness 100 μm) was ultrasonically welded to the current collector of the negative electrode. Thereafter, a separator was interposed between the positive electrode and the negative electrode, and then they were wound spirally and formed flatly to fabricate an electrode group.

A laminate film of 100 μm in thickness having both sides of an aluminum foil coated with polyethylene was pressed to form a rectangular cup, and the electrode group was put into this obtained case.

The electrode group in the case was dried in vacuum for 12 hours at 80° C. to remove moisture contained in the electrode group and laminate film.

After the liquid nonaqueous electrolyte was poured into the electrode group in the case by 4.8 g per 1 Ah of battery capacity, and the case was sealed by heat seal, a thin type nonaqueous electrolyte secondary battery of 3.6 mm in thickness, 35 mm in width, and 62 mm in height, having a structure as shown in FIGS. 1 and 2 was assembled.

This nonaqueous electrolyte secondary battery was processed as follows as initial charging and discharging process. First, at room temperature, charging was carried out for 15 hours at constant current and constant voltage up to 4.2 V at 108 mA. Then, at room temperature, discharging was carried out to 3.0 V at 108 mA, and a nonaqueous electrolyte secondary battery was manufactured.

EXAMPLES 41 TO 44

Nonaqueous electrolyte secondary batteries were manufactured in the same manner as in Example 40, except that the EC content, PC content, and GBL content in the nonaqueous solvent were changed as shown in Table 6.

EXAMPLES 45 TO 49

Nonaqueous electrolyte secondary batteries were manufactured in the same manner as in Example 40, except that the EC content, PC content, GBL content, and PRS content in the nonaqueous solvent were changed as shown in Table 6.

EXAMPLES 50 TO 53

Nonaqueous electrolyte secondary batteries were manufactured in the same manner as in Example 40, except that 1,4-butylene sultone (BTS) was used instead of PRS, and that the EC content, PC content, GBL content, and BTS content in the nonaqueous solvent were changed as shown in Table 6.

EXAMPLES 54 TO 57

Nonaqueous electrolyte secondary batteries were manufactured in the same manner as in Example 40, except that PRS and BTS were used as the sultone compound, and that the EC content, PC content, GBL content, PRS content, and BTS content in the nonaqueous solvent were changed as shown in Table 6.

EXAMPLES 58 AND 59

A nonaqueous solvent was prepared by mixing ethylene carbonate (EC), propylene carbonate (PC), γ-butyrolactone (GBL), vinylene carbonate (VC), and 1,3-propene sultone (PRS) at a volume ratio as shown in Table 6. In the obtained nonaqueous solvent, lithium tetrafluoro borate ($LiBF_4$) was dissolved to a concentration of 1.5 mol/L, and a liquid nonaqueous electrolyte was prepared.

Nonaqueous electrolyte secondary batteries were manufactured in the same manner as in Example 40, except that the above liquid nonaqueous electrolyte was used.

EXAMPLE 60

A nonaqueous solvent was prepared by mixing ethylene carbonate (EC), propylene carbonate (PC), γ-butyrolactone (GBL), vinylene carbonate (VC), and 1,4-butylene sultone (BTS) at a volume ratio as shown in Table 6. In the obtained nonaqueous solvent, lithium tetrafluoro borate ($LiBF_4$) was dissolved to a concentration of 1.5 mol/L, and a liquid nonaqueous electrolyte was prepared.

A nonaqueous electrolyte secondary battery was manufactured in the same manner as in Example 40, except that the above liquid nonaqueous electrolyte was used.

EXAMPLES 61 and 62

A nonaqueous solvent was prepared by mixing ethylene carbonate (EC), propylene carbonate (PC), γ-butyrolactone (GBL), ethyl methyl carbonate (EMC), and 1,3-propene sultone (PRS) at a volume ratio as shown in Table 6. In the obtained nonaqueous solvent, lithium tetrafluoro borate ($LiBF_4$) was dissolved to a concentration of 1.5 mol/L, and a liquid nonaqueous electrolyte was prepared.

Nonaqueous electrolyte secondary batteries were manufactured in the same manner as in Example 40, except that the above liquid nonaqueous electrolyte was used.

EXAMPLE 63

A nonaqueous solvent was prepared by mixing ethylene carbonate (EC), propylene carbonate (PC), γ-butyrolactone (GBL), ethyl methyl carbonate (EMC), and 1,4-butylene sultone (BTS) at a volume ratio as shown in Table 6. In the obtained nonaqueous solvent, lithium tetrafluoro borate ($LiBF_4$) was dissolved to a concentration of 1.5 mol/L, and a liquid nonaqueous electrolyte was prepared.

A nonaqueous electrolyte secondary battery was manufactured in the same manner as in Example 40, except that the above liquid nonaqueous electrolyte was used.

EXAMPLE 64

In a nonaqueous solvent having the same composition as in Example 40, lithium tetrafluoro borate ($LiBF_4$) and lithium hexafluoro phosphate ($LiPF_6$) were dissolved to a concentration of 1.5 mol/L ($LiBF_4$) and 0.1 mol/L ($LiPF_6$) respectively, and a liquid nonaqueous electrolyte was prepared.

A thin type nonaqueous electrolyte secondary battery was prepared in the same manner as in Example 40, except that the above liquid nonaqueous electrolyte was used.

EXAMPLE 65

In a nonaqueous solvent having the same composition as in Example 40, $LiBF_4$ and $LiN(C_2F_5SO_2)_2$ were dissolved to a concentration of 1.5 mol/L ($LiBF_4$) and 0.1 mol/L [$LiN(C_2F_5SO_2)_2$] respectively, and a liquid nonaqueous electrolyte was prepared.

A thin type nonaqueous electrolyte secondary battery was prepared in the same manner as in Example 40, except that the above liquid nonaqueous electrolyte was used.

COMPARATIVE EXAMPLE 12

A nonaqueous electrolyte secondary battery was manufactured in the same manner as in Example 40, except that a sultone compound was not added in the nonaqueous solvent.

COMPARATIVE EXAMPLE 13

A nonaqueous electrolyte secondary battery was manufactured in the same manner as in Example 40, except that the volume ratio of PRS in the nonaqueous solvent was set as shown in Table 7.

COMPARATIVE EXAMPLES 14 to 17

Nonaqueous electrolyte secondary batteries were manufactured in the same manner as in Example 40, except that the volume ratio of ethylene carbonate (EC), propylene carbonate (PC), γ-butyrolactone (GBL), and 1,3-propene sultone (PRS) in the nonaqueous solvent was changed as in Table 7

COMPARATIVE EXAMPLE 18

A nonaqueous electrolyte secondary battery was manufactured in the same manner as in Comparative example 13, except that 1,4-butylene sultone (BTS) was added at the volume ratio as shown in Table 7 instead of the PRS in the nonaqueous solvent.

COMPARATIVE EXAMPLE 19

A nonaqueous electrolyte secondary battery was manufactured in the same manner as in Comparative example 13, except that PRS and BTS were added at the volume ratio as shown in Table 7 instead of the PRS in the nonaqueous solvent.

COMPARATIVE EXAMPLE 20

A nonaqueous electrolyte secondary battery was manufactured in the same manner as in Comparative example 12, except that metal lithium was used as the negative electrode.

COMPARATIVE EXAMPLE 21

A nonaqueous electrolyte secondary battery was manufactured in the same manner as in Example 40, except that metal lithium was used as the negative electrode.

COMPARATIVE EXAMPLE 22

A nonaqueous electrolyte secondary battery was manufactured in the same manner as in Example 40, except that propane sultone (PS) was used instead of PRS.

In the secondary batteries obtained in Examples 40 to 65 and Comparative examples 12 to 22, the thickness increase rate in initial charging and high temperature storage characteristic were evaluated in the following conditions, and the results are shown in Tables 6 and 7.

(Thickness Increase Rate in Initial Charging)

Each secondary battery was charged for 15 hours at room temperature, as explained in Example 40, at constant current and constant voltage to 4.2 V at a current value of 108 mA. One hour after the charging, the thickness of the battery case was measured, and the thickness increase rate (%) in initial charging was determined in the following formula (4):

$$\{(T_1-T_0)/T_0\} \times 100(\%) \qquad (4)$$

where $T_0$ is the thickness of the battery case immediately before charging, and $T_1$ is the thickness of the battery case one hour after charging.

(Capacity Before High Temperature Storage)

Each secondary battery was charged, after the initial charging and discharging process as explained in Example 40, for 3 hours at constant current and constant voltage to 4.2 V at a current value of 540 mA, and discharged until 3.0 V at a current value of 540 mA, and the discharge capacity was measured, which was obtained as the capacity before high temperature storage.

(High Temperature Storage Characteristic)

Each secondary battery was charged for 3 hours at constant current and constant voltage to 4.2 V at a current value of 540 mA, and stored in the charged state in the atmosphere of 65° C. for 30 days. One hour after the storage period, the thickness of the battery case was measured, and the thickness change rate (%) of the battery case during storage period was determined in the following formula (5):

$$\{(t_1-t_0)/t_0\} \times 100(\%) \qquad (5)$$

where $t_0$ is the thickness of the battery case immediately before storage, and $t_1$ is the thickness of the battery case one hour after storage.

Afterwards, the battery was discharged until cutoff voltage of 3.0 V at a current value of 540 mA, and the residual capacity was determined, and the residual capacity was expressed in terms of the capacity in 540 mA discharge immediately before high temperature storage as 100%. The results are shown in Tables 6 and 7 as the capacity maintenance rate in 65° C. storage.

After confirming the residual capacity, the battery was further charged for 3 hours at constant current and constant voltage to 4.2 V at a current value of 540 mA, and then discharged until end voltage of 3.0 V at a current value of 540 mA, and the capacity was measured at this time. The obtained discharge capacity at 540 mA after high temperature storage was expressed in terms of the capacity in 540 mA discharge immediately before high temperature storage as 100%, and the result is expressed as the capacity recovery rate after 65° C. storage.

TABLE 6

| Examples | EC ratio (vol. %) | PC ratio (vol. %) | GBL ratio (vol. %) | Subsidiary component (% is vol. %) | Sultone compound type (% is vol. %) | Electrolyte type | Electrolyte concentration (mol/L) |
|---|---|---|---|---|---|---|---|
| 40 | 33 | 33 | 33 | — | PRS 1% | LiBF$_4$ | 1.5 |
| 41 | 19 | 51 | 29 | — | PRS 1% | LiBF$_4$ | 1.5 |

TABLE 6-continued

| | | | | | | | |
|---|---|---|---|---|---|---|---|
| 42 | 40 | 23 | 36 | — | PRS 1% | LiBF$_4$ | 1.5 |
| 43 | 26 | 27 | 46 | — | PRS 1% | LiBF$_4$ | 1.5 |
| 44 | 33 | 50 | 16 | — | PRS 1% | LiBF$_4$ | 1.5 |
| 45 | 33 | 32 | 33 | — | PRS 2% | LiBF$_4$ | 1.5 |
| 46 | 31 | 32 | 32 | — | PRS 5% | LiBF$_4$ | 1.5 |
| 47 | 30 | 30 | 30 | — | PRS 10% | LiBF$_4$ | 1.5 |
| 48 | 34 | 33 | 32.99 | — | PRS 0.01% | LiBF$_4$ | 1.5 |
| 49 | 33 | 32.9 | 34 | — | PRS 0.1% | LiBF$_4$ | 1.5 |
| 50 | 33 | 32.9 | 34 | — | BTS 0.1% | LiBF$_4$ | 1.5 |
| 51 | 33 | 33 | 33 | — | BTS 1% | LiBF$_4$ | 1.5 |
| 52 | 31 | 32 | 32 | — | BTS 5% | LiBF$_4$ | 1.5 |
| 53 | 30 | 30 | 30 | — | BTS 10% | LiBF$_4$ | 1.5 |
| 54 | 33 | 32.9 | 34 | — | PRS 0.05% + BTS 0.05% | LiBF$_4$ | 1.5 |
| 55 | 33 | 33 | 33 | — | PRS 0.5% + BTS 0.5% | LiBF$_4$ | 1.5 |
| 56 | 31 | 32 | 32 | — | PRS 2.5% + BTS 2.5% | LiBF$_4$ | 1.5 |
| 57 | 30 | 30 | 30 | — | PRS 5% + BTS 5% | LiBF$_4$ | 1.5 |
| 58 | 33 | 33 | 32.5 | VC 0.5% | PRS 1% | LiBF$_4$ | 1.5 |
| 59 | 33 | 32 | 30 | VC5% | PRS 1% | LiBF$_4$ | 1.5 |
| 60 | 33 | 33 | 32.5 | VC 0.5% | BTS 1% | LiBF$_4$ | 1.5 |
| 61 | 33 | 33 | 32 | EMC 1% | PRS 1% | LiBF$_4$ | 1.5 |
| 62 | 33 | 32 | 30 | EMC5% | PRS 1% | LiBF$_4$ | 1.5 |
| 63 | 33 | 33 | 32 | EMC 1% | BTS 1% | LiBF$_4$ | 1.5 |
| 64 | 33 | 33 | 33 | — | PRS 1% | LiBF$_4$ | 1.5 |
|    |    |    |    |   |        | LiPF$_6$ | 0.1 |
| 65 | 33 | 33 | 33 | — | PRS 1% | LiBF$_4$ | 1.5 |
|    |    |    |    |   |        | LiN(C$_2$F$_5$SO$_2$)$_2$ | 0.1 |

| Examples | Thickness increase rate in initial charging (%) | Capacity before high temperature storage (mAh) | After storage for 30 days at 65° C. in charged state | | |
|---|---|---|---|---|---|
| | | | Thickness change rate of battery case (%) | Capacity maintenance rate (%) | Capacity recovery rate (%) |
| 40 | 8.0 | 539 | 1.4 | 83 | 90 |
| 41 | 8.2 | 537 | 1.7 | 82 | 89 |
| 42 | 8.3 | 535 | 1.7 | 82 | 90 |
| 43 | 8.2 | 537 | 1.6 | 81 | 90 |
| 44 | 8.1 | 536 | 1.6 | 83 | 89 |
| 45 | 8.1 | 535 | 1.5 | 89 | 94 |
| 46 | 8.0 | 533 | 1.3 | 87 | 93 |
| 47 | 8.0 | 531 | 1.3 | 85 | 83 |
| 48 | 8.4 | 537 | 1.6 | 80 | 87 |
| 49 | 8.3 | 537 | 1.6 | 82 | 88 |
| 50 | 8.3 | 534 | 1.7 | 81 | 87 |
| 51 | 8.2 | 538 | 1.6 | 83 | 89 |
| 52 | 8.1 | 533 | 1.5 | 88 | 86 |
| 53 | 8.1 | 532 | 1.3 | 84 | 81 |
| 54 | 8.3 | 538 | 1.6 | 83 | 88 |
| 55 | 8.2 | 538 | 1.7 | 85 | 90 |
| 56 | 8.1 | 536 | 1.4 | 87 | 92 |
| 57 | 8.1 | 532 | 1.4 | 84 | 82 |
| 58 | 8.1 | 534 | 1.9 | 92 | 96 |
| 59 | 8.4 | 532 | 1.9 | 90 | 94 |
| 60 | 8.2 | 536 | 1.9 | 92 | 95 |
| 61 | 8.2 | 537 | 1.8 | 88 | 93 |
| 62 | 8.5 | 531 | 1.9 | 84 | 90 |
| 63 | 8.2 | 535 | 1.7 | 88 | 93 |
| 64 | 8.1 | 534 | 1.6 | 85 | 89 |
| 65 | 8.2 | 535 | 1.6 | 84 | 91 |

TABLE 7

| | EC ratio (vol. %) | PC ratio (vol. %) | GBL ratio (vol. %) | Sultone compound type (% is vol. %) | Electrolyte type | Electrolyte concentration (mol/L) |
|---|---|---|---|---|---|---|
| Comparative example 12 | 33.3 | 33.4 | 33.3 | None | LiBF$_4$ | 1.5 |
| Comparative example 13 | 28.3 | 28.3 | 28.4 | PRS15 vol % | LiBF$_4$ | 1.5 |
| Comparative example 14 | 11 | 55 | 33 | PRS 1 vol % | LiBF$_4$ | 1.5 |
| Comparative example 15 | 45 | 10 | 44 | PRS 1 vol % | LiBF$_4$ | 1.5 |

TABLE 7-continued

| | | | | | | |
|---|---|---|---|---|---|---|
| Comparative example 16 | 21 | 23 | 55 | PRS 1 vol % | LiBF$_4$ | 1.5 |
| Comparative example 17 | 13 | 82 | 4 | PRS 1 vol % | LiBF$_4$ | 1.5 |
| Comparative example 18 | 28.3 | 28.3 | 28.4 | BTS15 vol % | LiBF$_4$ | 1.5 |
| Comparative example 19 | 28.3 | 28.3 | 28.4 | PRS 7.5 vol % + BTS 7.5 vol % | LiBF$_4$ | 1.5 |
| Comparative example 20 (metal Li) | 33.3 | 33.4 | 33.3 | None | LiBF$_4$ | 1.5 |
| Comparative example 21 (metal Li) | 33 | 33 | 33 | PRS 1 vol % | LiBF$_4$ | 1.5 |
| Comparative example 22 | 33 | 33 | 33 | PS 1 vol % | LiBF$_4$ | 1.5 |

| | Thickness increase rate in initial charging (%) | Capacity before high temperature storage (mAh) | After storage for 30 days at 65° C. in charged state | | |
|---|---|---|---|---|---|
| | | | Thickness change rate of battery case (%) | Capacity maintenance rate (%) | Capacity recovery rate (%) |
| Comparative example 12 | 11.4 | 523 | 10.1 | 54 | 70 |
| Comparative example 13 | 8.3 | 505 | 2.0 | 81 | 60 |
| Comparative example 14 | 8.7 | 520 | 8.9 | 71 | 74 |
| Comparative example 15 | 8.9 | 524 | 6.4 | 68 | 73 |
| Comparative example 16 | 9 | 520 | 8.5 | 61 | 70 |
| Comparative example 17 | 51.6 | 423 | Not evaluable | Not evaluable | Not evaluable |
| Comparative example 18 | 8.5 | 506 | 2.1 | 80 | 61 |
| Comparative example 19 | 8.4 | 507 | 2.1 | 79 | 63 |
| Comparative example 20 (metal Li) | 13.5 | 510 | 21.9 | 49 | 64 |
| Comparative example 21 (metal Li) | 11.4 | 506 | 19.8 | 56 | 69 |
| Comparative example 22 | 9.6 | 529 | 20.2 | 50 | 62 |

Examples 40 to 65 and Comparative examples 12 to 22 shown in Tables 6 and 7 disclose the following.

In Comparative example 12 which is similar to Example 40 except that PRS is not added, since a dense protective film is not formed on the negative electrode, after storage for 30 days at 65° C. in the charged state, the capacity maintenance rate and capacity recovery rate are lowered. In Comparative example 13 of which PRS content is more than 10 vol. %, the protective film is too rigid, thus the resistance increases in the course of 30-day storage at 65° C. in the charged state, and hence the capacity recovery rate after storage is lowered.

In Examples 40 to 49 in which the volume ratio of EC, PC, GBL and PRS is within a specified range, thickness changes of the battery case in initial charging are suppressed, and moreover, the characteristics after 30-day storage at 65° C. in the charged state are suited as the power source for portable appliances. On the other hand, in Comparative examples 14 to 16 in which any one of EC, PC and GBL is out of the specified range, even if PRS is added, the formed protective film does not have sufficient characteristic, thus the characteristics are lowered when stored for 30 days at 65° C. in the charged state. In Comparative example 17 in which all of EC, PC and GBL are out of the specified range, even if PRS is added, it is hard to suppress reaction of PC and negative electrode in initial charging, thus gas is generated, and the battery case is swollen significantly.

Although in Examples 50 to 57, BTS or both PRS and BTS are used as the sultone compound, the characteristics are equivalent as compared with Examples 40, 46, 47, and 49, and it is known that same effects are obtained even if PRS and BTS is used alone or together as the sultone compound. On the other hand, in Comparative examples 18 and 19 in which the volume ratio of BTS or PRS and BTS is more than 10 vol. %, same as in Comparative example 13, the protective film by the sultone compound is too rigid, thus the resistance increases in the course of 30-day storage at 65° C. in the charged state, and hence the capacity recovery rate after storage is lowered.

Since in Examples 58 to 63, vinylene carbonate (VC) or ethyl methyl carbonate (EMC) is contained as the subsidiary component at a rate of 10 vol. % or less, in addition to EC, PC, PRS (or BTS) and GBL, the density of the protective film of the negative electrode can be enhanced by using PC and the sultone compound such as PRS and BTS. As a result, the capacity maintenance rate and capacity recovery rate after 30-day storage at 65° C. in the charged state are improved. However, if the addition of VC or EMC is increased, the gas generation amount tends to increase due to decomposition of excessive VC or EMC during storage at 65° C. in the charged state.

Although Example 64 comprises lithium tetrafluoro borate ($LiBF_4$) and lithium hexafluoro phosphate ($LiPF_6$) as the electrolyte, and Example 65 comprises $LiBF_4$ and LiN $(C_2F_5SO_2)_2$ as the electrolyte, they have the same characteristics as the evaluation result of Example 40 comprising $LiBF_4$ only.

In Comparative examples 20 and 21, the negative electrode made of metal lithium is used. However, when the negative electrode made of metal lithium is used, regardless of presence or absence of addition of the sultone compound in the nonaqueous solvent, the battery case is swollen during storage at 65° C. in the charged state, and a large difference is not seen in the capacity maintenance rate and capacity recovery rate after storage, thus the characteristics are notably lowered as compared with the case of using the negative electrode containing the carbonaceous material as shown in Example 40. This is because the negative electrode composed of metal lithium is extremely high in reactivity with GBL as compared with the electrode containing the carbonaceous material, thus the reaction of the negative electrode and GBL is not suppressed sufficiently in the protective film derived from the sultone compound.

In Comparative example 22, the propane sultone (PS) is used, but as compared with Example 40 using the same amount of PRS, the battery case is swollen during storage at 65° C. in the charged state, and the capacity maintenance rate and capacity recovery rate after storage are lowered substantially. Since the PS does not have double bond, as compared with the PRS having a double bond and inducing polymerization reaction by opening the double bond at the time of reaction with the negative electrode, the density and strength of the protective film formed on the negative electrode are lowered.

EXAMPLE 66

A nonaqueous solvent was prepared by mixing ethylene carbonate (EC), propylene carbonate (PC), γ-butyrolactone (GBL), and 1,3-propene sultone (PRS) at a volume ratio (EC:PC:GBL:PRS) of 33:33:33:1. In the obtained nonaqueous solvent, lithium tetrafluoro borate ($LiBF_4$) was dissolved to a concentration of 1.5 mol/L, and a liquid nonaqueous electrolyte was prepared.

Mixing polyethylene glycol diacrylate (molecular weight 1000) and a liquid nonaqueous electrolyte at a rate of 1:10 by weight, 5000 ppm of t-hexyl peroxy pivalate was added as a thermal polymerization initiator, and thereby a pregel solution was prepared.

An electrode group was fabricated in the same manner as in Example 40, and this electrode group was put in a case, and dried in vacuum, and then the pregel solution was poured in at a rate of 5.2 g per 1 Ah of battery capacity. After sealing by heat seal, by heating for an hour at 60° C., the pregel solution was polymerized and crosslinked to form a gel nonaqueous electrolyte, and a thin type nonaqueous electrolyte secondary battery was obtained.

COMPARATIVE EXAMPLE 23

A nonaqueous electrolyte secondary battery was manufactured in the same manner as in Example 66 except that 1,3-propene sultone was not added in the pregel solution.

In the secondary batteries obtained in Example 66 and Comparative example 23, the thickness increase rate in initial charging and high temperature storage characteristic were evaluated in the same conditions as explained in Example 40, and the results are shown in Table 8.

TABLE 8

| | (Gel nonaqueous electrolyte) | | | | | |
| --- | --- | --- | --- | --- | --- | --- |
| | EC ratio (vol. %) | PC ratio (vol. %) | GBL ratio (vol. %) | Sultone compound type (vol. %) | Electrolyte type | Electrolyte concentration (mol/L) |
| Example 66 | 33 | 33 | 33 | PRS 1 vol % | $LiBF_4$ | 1.5 |
| Comparative example 23 | 33.3 | 33.4 | 33.3 | None | $LiBF_4$ | 1.5 |

| | Thickness increase rate in initial charging (%) | Capacity before high temperature storage (mAh) | After storage for 30 days at 65° C. in charged state | | |
| --- | --- | --- | --- | --- | --- |
| | | | Thickness change rate of battery case (%) | Capacity maintenance rate (%) | Capacity recovery rate (%) |
| Example 66 | 8.6 | 530 | 1.5 | 84 | 90 |
| Comparative example 23 | 8.8 | 520 | 7.5 | 55 | 68 |

As clear from Table 8, between Example 66 and Comparative example 23, there is a characteristic difference as observed between Example 40 and Comparative example 12, and it is known that the effect of addition of the sultone compound having a double bond such as PRS is also recognized in the gel nonaqueous electrolyte.

(Method of Detecting PRS and VC)

In the secondary battery of Example 58, after the initial charging and discharging process, the potential was sufficiently stabilized by opening the circuit for 5 hours or more, it was decomposed in a glove box at Ar concentration of 99.9% or more and dew point of −50° C. or less, and the electrode group was taken out. The electrode group was put into a centrifugal settling tube, and dimethyl sulfoxide (DMSO)-$d_6$ was added to seal, and it was taken out from the glove box, and separated centrifugally. Thereafter, in the glove box, a mixed solution of the electrolyte and DMSO-$d_6$ was sampled from the centrifugal settling tube. The mixed solution was poured into an NMR test tube of 5 mm in diameter by about 0.5 ml, and the NMR measurement was carried out. An apparatus used in the NMR measurement was model JNM-LA400WB of JEOL Ltd., the observation nucleus was $^1$H, the observation frequency was 400 MHz, and the residual proton signal slightly contained in the dimethyl sulfoxide (DMSO)-$d_6$ was used as internal standard (2.5 ppm). The measuring temperature was 25° C. In the $^1$H NMR spectrum, the peak corresponding to EC was observed around 4.5 ppm, and the peak corresponding to VC, around 7.7 ppm. On the other hand, the peak corresponding to PRS was observed around 5.1 ppm ($P_1$), around 7.05 ppm (P2), and around 7.2 ppm ($P_3$) as shown in FIG. 8. It was confirmed from these results that VC and PRS were contained in the nonaqueous solvent in the secondary battery in Example 58 after the initial charging and discharging process.

Further, when at the observation frequency of 100 MHz, $^{13}$C NMR was measured by using dimethyl sulfoxide (DMSO)-$d_6$ (39.5 ppm) as an internal standard substance, the peak corresponding to EC was observed around 66 ppm, the peak corresponding to VC around 133 ppm, and the peak corresponding to PRS around 74 ppm, around 124 ppm, and around 140 ppm. It was also confirmed from these results that VC and PRS were contained in the nonaqueous solvent in the secondary battery in Example 58 after the initial charging and discharging process.

Moreover, in the $^1$H NMR spectrum, the ratio of NMR integral intensity of VC to the NMR integral intensity of EC, and the ratio of NMR integral intensity of PRS to the NMR integral intensity of EC were determined, and it was confirmed that both the VC rate and PRS rate in the entire nonaqueous solvent were decreased from before assembly of the secondary battery.

EXAMPLE 67

<Fabrication of Positive Electrode>

To 90 wt. % of lithium cobalt oxide ($Li_xCoO_2$, $0<x\leq1$) powder, 5 wt. % of acetylene black and dimethyl formamide (DMF) solution of 5 wt. % of polyvinylidene fluoride (PVdF) were added and mixed, and a slurry was prepared. The slurry was applied on both surfaces of a current collector made of aluminum foil of 15 μm in thickness, and dried and pressed, and thereby a positive electrode was fabricated in a structure having positive electrode layers carried on both surfaces of the current collector. The thickness of the positive electrode layer was 60 μm at one side.

<Fabrication of Negative Electrode>

As a carbonaceous material, powder of mesophase pitch-based carbon fiber heated at 3000° C. (layer spacing ($d_{002}$) of (002) plane determined by powder X-ray diffraction being 0.336 nm) was used by 95 wt. %, and it was mixed with a dimethyl formamide (DMF) solution of 5 wt. % of polyvinylidene fluoride (PVdF), and a slurry was prepared. The slurry was applied on both surfaces of a current collector made of copper foil of 12 μm in thickness, and dried and pressed, and thereby a negative electrode was fabricated in a structure having negative electrode layers carried on both surfaces of the current collector. The thickness of the negative electrode layer was 55 μm at one side.

The layer spacing $d_{002}$ Of (002) plane of the carbonaceous material was determined by FWHM (full width at half-maximum) middle point method from the powder X-ray diffraction spectrum. At this time, scatter such as Lorentz scatter was not corrected.

<Separator>

A separator made of a microporous polyethylene film of 25 μm in thickness was prepared.

<Preparation of Nonaqueous Electrolysis Solution>

Ethylene carbonate (EC), methyl ethyl carbonate (MEC), and 1,3-propene sultone (PRS) were mixed by a volume ratio (EC:MEC:PRS) of 33:66:1, and a nonaqueous solvent was prepared. In the obtained nonaqueous solvent, lithium hexafluoro phosphate ($LiPF_6$) was dissolved to a concentration of 1 mol/L, and a liquid nonaqueous electrolyte was prepared.

<Fabrication of Electrode Group>

A positive electrode tab made of ribbon-shaped aluminum foil that has a thickness of 100 μm and a width of shorter side of 4 mm was ultrasonically welded to an uncoated area of the current collector of the positive electrode. And a negative electrode tab made of ribbon-shaped nickel foil that has a thickness of 100 μm and a width of shorter side of 4 mm was ultrasonically welded to an uncoated area of the current collector of the negative electrode. Thereafter, a separator was interposed between the positive electrode and the negative electrode, and they were wound spirally and formed flatly, so that an electrode group having an inner-inner tab structure as shown in FIG. 5 was fabricated. In the obtained electrode group, the shortest distance D between the positive electrode tab and the negative electrode tab was 14 mm.

A laminate film of 100 μm in thickness having both sides of an aluminum foil coated with polyethylene was pressed to form a rectangular cup, and the electrode group was put into this obtained case.

The electrode group in the case was dried in vacuum for 12 hours at 80° C. to remove moisture contained in the electrode group and laminate film.

The liquid nonaqueous electrolyte was poured into the electrode group in the case by 4.8 g per 1 Ah of battery capacity, and the case was sealed by heat seal, and thereby a thin type nonaqueous electrolyte secondary battery of 3.6 mm in thickness, 35 mm in width, and 62 mm in height, having a structure as shown in FIG. 1 and 2 was assembled.

EXAMPLES 68 TO 86

Nonaqueous electrolyte secondary batteries were assembled in the same manner as in Example 67, except that the composition of the nonaqueous solvent, type and concentration of the electrolyte, type and blending ratio of the sultone compound, and shortest distance D between the positive electrode tab and the negative electrode tab were set as shown in Tables 9 and 10.

EXAMPLE 87

A nonaqueous electrolyte secondary battery was assembled in the same manner as in Example 70, except that the positive electrode tab was arranged at the winding end portion of the positive electrode while the negative electrode tab was arranged at the winding start portion of the negative electrode as shown in FIG. 6.

EXAMPLE 88

A nonaqueous electrolyte secondary battery was assembled in the same manner as in Example 70, except that the positive electrode tab was arranged at the winding end portion of the positive electrode while the negative electrode tab was arranged at the winding start portion of the negative electrode as shown in FIG. 7, and that the number of turns was a half turn more than in Example 87.

EXAMPLE 89

A nonaqueous electrolyte secondary battery was assembled in the same manner as in Example 67, except that the same nonaqueous electrolysis solution as used in Example 40 was used.

EXAMPLE 90

A nonaqueous electrolyte secondary battery was assembled in the same manner as in Example 67, except that the same nonaqueous electrolysis solution as used in Example 58 was used.

EXAMPLE 91

A nonaqueous electrolyte secondary battery was assembled in the same manner as in Example 67, except that the same nonaqueous electrolysis solution as used in Example 22 was used.

EXAMPLE 92

A nonaqueous electrolyte secondary battery was assembled in the same manner as in Example 67, except that the same nonaqueous electrolysis solution as used in Example 28 was used.

EXAMPLE 93

A nonaqueous electrolyte secondary battery was assembled in the same manner as in Example 67, except that the same nonaqueous electrolysis solution as used in Example 32 was used.

EXAMPLE 94

An aluminum sheet of 300 μm in thickness was formed in a box of 5 mm in thickness, 30 mm in width, and 48 mm in height, and the same electrode group as in Example 67 was put in the obtained case.

The electrode group in the case was dried in vacuum for 12 hours at 80° C. to remove moisture adsorbed in the electrode group and aluminum box.

The liquid nonaqueous electrolyte same as explained in Example 67 was poured into the electrode group in the case by 3.4 g per 1 Ah of battery capacity, and the case was sealed, and thereby a prismatic type nonaqueous electrolyte secondary battery of 5 mm in thickness, 30 mm in width, and 48 mm in height, having a structure as shown in FIG. 3 was assembled.

COMPARATIVE EXAMPLES 24 to 30

Thin type nonaqueous electrolyte secondary batteries were manufactured in the same manner as in Example 67, except that the composition of the nonaqueous solvent, type and concentration of the electrolyte, type and blending ratio of the sultone compound, and shortest distance D between the positive electrode tab and the negative electrode tab were set shown in Table 10.

COMPARATIVE EXAMPLE 31

A prismatic type nonaqueous electrolyte secondary battery was assembled in the same manner as in Example 94, except that the shortest distance between the positive electrode tab and the negative electrode tab was 5 mm.

In the secondary batteries obtained in Examples 67 to 94 and Comparative examples 24 to 31, swelling of the battery case after 500 cycles and the capacity maintenance rate in 500 cycles were measured in the following methods, and results are shown in Tables 9 and 10.

(Battery Case Swelling and Capacity Maintenance Rate After 500 Cycles)

Each secondary battery was charged for 15 hours at room temperature at constant current and constant voltage to 4.2 V at 0.2C (130 mA), and then discharged at room temperature to 3.0 V at 0.2C, as initial charging and discharging process.

Next, at room temperature, the batteries were charged for 3 hours at constant current and constant voltage to 4.2 V at 1.0C (650 mA), and discharged at room temperature to 3.0 V at 1.0C. The thickness $t_0$ of the battery case was measured at this time.

After repeating 500 cycles of charging and discharging at charging and discharging rate of 1C, charge end voltage of 4.2 V, and discharge end voltage of 3.0 V, the thickness $t_1$ of the battery case was measured in discharged state, and the thickness change rate of the battery case after 500 cycles was determined in the following formula (6). Also after 500 cycles, the discharge capacity was measured, and the capacity maintenance rate after 500 cycles was calculated as compared with the discharge capacity at the first cycle as 100%, and results are shown in Tables 9 and 10:

$$((t_1-t_0)/t_0) \times 100(\%) \qquad (6)$$

where $t_0$ is the thickness of the battery case before the cycle test, and $t_1$ is the thickness of the battery case after 500 cycles.

In Tables 9 and 10, BTS is 1,4-butylene sultone, DEC is diethyl carbonate, GBL is γ-butyrolactone, PC is propylene carbonate, and VC is vinylene carbonate.

TABLE 9

|  | Composition of nonaqueous solvent (% is vol. %) | Electrolyte/ electrolyte concentration | Type and blending ratio of sultone compound | Shortest distance between tabs (mm) | Thickness change rate of battery case (%) | Capacity maintenance rate after 500 cycles (%) |
| --- | --- | --- | --- | --- | --- | --- |
| Example 67 | 33% EC, 66% MEC | LiPF$_6$/1 moL/L | PRS-1 vol. % | 14 | 10 | 80 |
| Example 68 | 33% EC, 33% MEC, 33% DEC | LiPF$_6$/1 moL/L | PRS-1 vol. % | 14 | 8 | 83 |
| Example 69 | 49.5% EC, 49.5% GBL | LiBF$_4$/1.5 moL/L | PRS-1 vol. % | 14 | 9 | 85 |
| Example 70 | 49.5% EC, 49.5% PC | LiPF$_6$/1 moL/L | PRS-1 vol. % | 14 | 8 | 83 |
| Example 71 | 33% EC, 66% MEC | LiPF$_6$/1 moL/L | BTS-1 vol. % | 14 | 11 | 78 |
| Example 72 | 33% EC, 33% MEC, 33% DEC | LiPF$_6$/1 moL/L | BTS-1 vol. % | 14 | 8 | 81 |
| Example 73 | 49.5% EC, 49.5% GBL | LiBF$_4$/1.5 moL/L | BTS-1 vol. % | 14 | 10 | 80 |
| Example 74 | 49.5% EC, 49.5% PC | LiPF$_6$/1 moL/L | BTS-1 vol. % | 14 | 9 | 82 |
| Example 75 | 33% EC, 66% MEC | LiPF$_6$/1 moL/L | PRS-1 vol. % | 6 | 14 | 75 |
| Example 76 | 49.5% EC, 49.5% PC | LiPF$_6$/1 moL/L | PRS-1 vol. % | 6 | 13 | 77 |
| Example 77 | 33% EC, 66% MEC | LiPF$_6$/1 moL/L | PRS-1 vol. % | 8 | 13 | 78 |
| Example 78 | 49.5% EC, 49.5% PC | LiPF$_6$/1 moL/L | PRS-1 vol. % | 8 | 11 | 79 |
| Example 79 | 33% EC, 66% MEC | LiPF$_6$/1 moL/L | PRS-1 vol. % | 10 | 11 | 79 |
| Example 80 | 49.5% EC, 49.5% PC | LiPF$_6$/1 moL/L | PRS-1 vol. % | 10 | 9 | 82 |
| Example 81 | 33% EC, 66% MEC | LiPF$_6$/1 moL/L | PRS-1 vol. % | 16 | 12 | 80 |
| Example 82 | 49.5% EC, 49.5% PC | LiPF$_6$/1 moL/L | PRS-1 vol. % | 16 | 10 | 80 |
| Example 83 | 33% EC, 66% MEC | LiPF$_6$/1 moL/L | PRS-1 vol. % | 17 | 14 | 78 |
| Example 84 | 49.5% EC, 49.5% PC | LiPF$_6$/1 moL/L | PRS-1 vol. % | 17 | 13 | 77 |

TABLE 10

|  | Composition of nonaqueous solvent (% is vol. %) | Electrolyte/ electrolyte concentration | Type and blending ratio of sultone compound | Shortest distance between tabs (mm) | Thickness change rate of battery case (%) | Capacity maintenance rate after 500 cycles (%) |
| --- | --- | --- | --- | --- | --- | --- |
| Example 85 | 33% EC, 66% MEC | LiPF$_6$/1 moL/L | PRS-1 vol. % | 18 | 15 | 77 |
| Example 86 | 49.5% EC, 49.5% PC | LiPF$_6$/1 moL/L | PRS-1 vol. % | 18 | 15 | 75 |
| Example 87 | 49.5% EC, 49.5% PC | LiPF$_6$/1 moL/L | PRS-1 vol. % | 14 | 9 | 82 |
| Example 88 | 49.5% EC, 49.5% PC | LiPF$_6$/1 moL/L | PRS-1 vol. % | 14 | 9 | 81 |
| Example 89 | 33% EC, 33% PC, 33% GBL | LiBF$_4$/1.5 moL/L | PRS-1 vol. % | 14 | 12 | 85 |
| Example 90 | 33% EC, 33% PC, 32.5% GBL, 0.5% VC | LiBF$_4$/1.5 moL/L | PRS-1 vol. % | 14 | 11 | 86 |
| Example 91 | 47.5% EC, 47.5% PC, 3% GBL | LiPF$_6$/1 moL/L | PRS-2 vol. % | 14 | 9 | 86 |
| Example 92 | 48.5% EC, 48.5% PC, 1% VC | LiPF$_6$/1 moL/L | PRS-2 vol. % | 14 | 10 | 88 |
| Example 93 | 47% EC, 47% PC, 3% GBL, 1% VC | LiPF$_6$/1 moL/L | PRS-2 vol. % | 14 | 8 | 87 |
| Example 94 | 33% EC, 66% MEC | LiPF$_6$/1 moL/L | PRS-1 vol. % | 14 | 6 | 81 |
| Comparative example 24 | 33% EC, 66% MEC | LiPF$_6$/1 moL/L | PRS-1 vol. % | 5 | 21 | 67 |
| Comparative example 25 | 33% EC, 33% MEC, 33% DEC | LiPF$_6$/1 moL/L | PRS-1 vol. % | 5 | 20 | 69 |
| Comparative example 26 | 49.5% EC, 49.5% GBL | LiBF$_4$/1.5 moL/L | PRS-1 vol. % | 5 | 22 | 65 |
| Comparative example 27 | 33% EC, 66% MEC | LiPF$_6$/1 moL/L | PRS-1 vol. % | 19 | 24 | 68 |
| Comparative example 28 | 33% EC, 33% MEC, 33% DEC | LiPF$_6$/1 moL/L | PRS-1 vol. % | 19 | 23 | 69 |
| Comparative example 29 | 49.5% EC, 49.5% GBL | LiBF$_4$/1.5 moL/L | PRS-1 vol. % | 19 | 24 | 60 |
| Comparative example 30 | 33% EC, 66% MEC | LiPF$_6$/1 moL/L | None | 14 | 35 | 40 |
| Comparative example 31 | 33% EC, 66% MEC | LiPF$_6$/1 moL/L | PRS-1 vol. % | 5 | 18 | 67 |

As clear from Tables 9 and 10, the secondary batteries of Examples 67 to 94 of which shortest distance between the positive electrode tab and the negative electrode tab is in a range of 6 to 18 mm are smaller in the change rate of the battery thickness after 500 cycles as compared with the secondary batteries of Comparative examples 24 to 29 and 31 of which shortest distance is out of the specified range or the secondary battery of Comparative example 30 which does not contain PRS.

By comparing Examples 67, 70, and 75 to 86, it is known that the shortest distance is preferred to be 8 to 17 mm, or more preferably 10 to 16 mm, in order to decrease the change rate of the battery thickness.

According to the results of Examples 67, 87, and 88, it is known that the change rate of the battery thickness after 500 cycles can be decreased, not only in the inner-inner tabs but also in the inner-outer tabs, as far as the shortest distance between the positive electrode tab and the negative electrode tab is in a range of 6 to 18 mm.

As known from the results in Examples 89 to 93, the capacity maintenance rate after 500 cycles can be enhanced in the secondary batteries of Examples 89 to 90 containing EC by 15 to 50 vol. %, PC by more than 20 vol. % and 70 vol. % or less, GBL by more than 10 vol. % and 50 vol. % or less, and the sultone compound by 10 vol. % or less, and the secondary batteries of Examples 91 to 93 containing EC by 15 to 60 vol. %, PC by 35 to 85 vol. %, GBL by 10 vol. % or less, and the sultone compound by 10 vol. % or less.

The invention can provide a nonaqueous electrolyte secondary battery decreased in gas generation in initial charging, and enhanced in the initial charging and discharging efficiency. The invention can also provide a nonaqueous electrolyte secondary battery smaller in gas generation in initial charging, and improved in high-temperature long-term storage characteristic in the charged state. Moreover, the invention can provide a nonaqueous electrolyte secondary battery decreased in distortion of the electrode group after repetition of charging and discharging cycles.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A nonaqueous electrolyte secondary battery comprising:
   an electrode group having a positive electrode and a negative electrode wound flatly by way of an interposed separator, the electrode group including a spiral winding surface having a laminated structure wherein the positive electrode, the separator and the negative electrode are laminated;
   a positive electrode lead tab electrically connected to the positive electrode, and projecting from the spiral winding surface of the electrode group;
   a negative electrode lead tab electrically connected to the negative electrode, and projecting from the spiral winding surface; and
   a nonaqueous solvent, wherein
   the nonaqueous solvent contains cyclic carbonate including ethylene carbonate (EC) and propylene carbonate (PC), and sultone compound including a ring that has at least one double bond,
   the EC, PC and sultone compound are, supposing x (vol. %), y (vol. %), and z (vol. %) respectively, contained in the total volume of the nonaqueous solvent at the rate of $15 \leq x \leq 60$, $35 \leq y \leq 85$, and $0 < z \leq 10$, and
   a distance between the positive electode lead tab and the negative electrode lead tab is 6 mm to 18 mm.

2. The nonaqueous electrolyte secondary battery according to claim 1, wherein the positive electrode lead tab is electrically connected to the positive electrode at an inner side of an outermost circumference of the electrode group, and the negative electrode lead tab is electrically connected to the negative electrode at an inner side of the outermost circumference of the electrode group.

3. The nonaqueous electrolyte secondary battery according to claim 1, wherein the positive electrode lead tab is electrically connected to the positive electrode at an outermost circumference of the electrode group, and the negative electrode lead tab is electrically connected to the negative electrode at an inner side of the outermost circumference of the electrode group.

4. The nonaqueous electrolyte secondary battery according to claim 1, wherein the negative electrode lead tab is electrically connected to the negative electrode at an outermost circumference of the electrode group, and the positive electrode lead tab is electrically connected to the positive electrode at an inner side of the outermost circumference of the electrode group.

5. The nonaqueous electrolyte secondary battery according to claim 1, wherein each of the positive electrode lead tab and the negative electrode lead tab has a width of 2 mm to 5 mm.

6. The nonaqueous electrolyte secondary battery according to claim 1, wherein the sultone compound includes at least one of 1,3-propene sultone and 1,4-butene sultone.

7. A nonaqueous electrolyte secondary battery comprising:
   an electrode group having a positive electrode and a negative electrode wound flatly by way of an interposed separator, the electrode group including a spiral winding surface having a laminated structure wherein the positive electrode, the separator and the negative electrode are laminated;
   a positive electrode lead tab electrically connected to the positive electrode, and projecting from the spiral winding surface of the electrode group;
   a negative electrode lead tab electrically connected to the negative electrode, and projecting from the spiral winding surface; and
   a nonaqueous solvent, wherein
   the nonaqueous solvent contains cyclic carbonate including ethylene carbonate (EC) and propylene carbonate (PC), γ-butyrolactone (GBL), and sultone compound including a ring that has at least one double bond,
   the EC, PC, GBL, and sultone compound are, supposing a (vol. %), b (vol. %), c (vol. %), and d (vol. %) respectively, contained in the total volume of the nonaqueous solvent at the rate of $15 \leq a \leq 50$, $20 < b \leq 70$, $10 < c \leq 50$, and $0 < d \leq 10$, and
   a distance between the positive electrode lead tab and the negative electrode lead tab is 6 mm to 18 mm.

8. The nonaqueous electrolyte secondary battery according to claim 7, wherein the positive electrode lead tab is electrically connected to the positive electrode at an inner side of an outermost circumference of the electrode group, and the negative electrode lead tab is electrically connected to the negative electrode at an inner side of the outermost circumference of the electrode group.

9. The nonaqueous electrolyte secondary battery according to claim 7, wherein the positive electrode lead tab is electrically connected to the positive electrode at an outermost circumference of the electrode group, and the negative electrode lead tab is electrically connected to the negative electrode at an inner side of the outermost circumference of the electrode group.

10. The nonaqueous electrolyte secondary battery according to claim 7, wherein the negative electrode lead tab is electrically connected to the negative electrode at an outermost circumference of the electrode group, and the positive electrode lead tab is electrically connected to the positive electrode at an inner side of the outermost circumference of the electrode group.

11. The nonaqueous electrolyte secondary battery according to claim 7, wherein each of the positive electrode lead tab and the negative electrode lead tab has a width of 2 mm to 5 mm.

12. The nonaqueous electrolyte secondary battery according to claim 7, wherein the sultone compound includes at least one of 1,3-propene sultone and 1,4-butene sultone.

13. A nonaqueous electrolyte secondary battery comprising:

an electrode group having a positive electrode and a negative electrode wound flatly by way of an interposed separator, the electrode group including a spiral winding surface having a laminated structure wherein the positive electrode, the separator and the negative electrode are laminated;

a case containing the electrode group;

a positive electrode lead tab electrically connected to the positive electrode, and having an end projected from the spiral winding surface of the electrode group and drawn outside through the case;

a negative electrode lead tab electrically connected to the negative electrode, and having an end projected from the spiral winding surface of the electrode group and drawn outside through the case; and a nonaqueous solvent, wherein the nonaqueous solvent contains cyclic carbonate including ethylene carbonate (EC) and propylene carbonate (PC), and sultone compound including a ring that has at least one double bond, the EC, PC and sultone compound are, supposing x (vol. %), y (vol. %), and z (vol. %) respectively, contained in the total volume of the nonaqueous solvent at the rate of $15 \leq x \leq 60$, $35 \leq y 85$, and $0 < z \leq 10$, and a distance between the positive electrode lead tab and the negative electrode lead tab is 6 mm to 18 mm.

14. The nonaqueous electrolyte secondary battery according to claim 13, wherein the positive electrode lead tab is electrically connected to the positive electrode at an inner side of an outermost circumference of the electrode group, and the negative electrode lead tab is electrically connected to the negative electrode at an inner side of the outermost circumference of the electrode group.

15. The nonaqueous electrolyte secondary battery according to claim 13, wherein the positive electrode lead tab is electrically connected to the positive electrode at an outermost circumference of the electrode group, and the negative electrode lead tab is electrically connected to the negative electrode at an inner side of the outermost circumference of the electrode group.

16. The nonaqueous electrolyte secondary battery according to claim 13, wherein the negative electrode lead tab is electrically connected to the negative electrode at an outermost circumference of the electrode group, and the positive electrode lead tab is electrically connected to the positive electrode at an inner side of the outermost circumference of the electrode group.

17. The nonaqueous electrolyte secondary battery according to claim 13, wherein each of the positive electrode lead tab and the negative electrode lead tab has a width of 2 mm to 5 mm.

18. A nonaqueous electrolyte secondary battery comprising:

an electrode group having a positive electrode and a negative electrode wound flatly by way of an interposed separator, the electrode group including a spiral winding surface having a laminated structure wherein the positive electrode, the separator and the negative electrode are laminated;

a case containing the electrode group;

a positive electrode lead tab electrically connected to the positive electrode, and having an end projected from the spiral winding surface of the electrode group and drawn outside through the case;

a negative electrode lead tab electrically connected to the negative electrode, and having an end projected from the spiral winding surface of the electrode group and drawn outside through the case; and a nonaqueous solvent, wherein the nonaqueous solvent contains cyclic carbonate including ethylene carbonate (EC) and propylene carbonate (PC), γ-butyrolactone (GBL), and sultone compound including a ring that has at least one double bond, the EC, PC, GBL, and sultone compound are, supposing a (vol. %), b (vol. %), c (vol. %), and d (vol. %) respectively, contained in the total volume of the nonaqueous solvent at the rate of $15 \leq a \leq 50$, $20 < b \leq 70$, $10 < c \leq 50$, and $0 < d \leq 10$, and a distance between the positive electrode lead tab and the negative electrode lead tab is 6 mm to 18 mm.

19. The nonaqueous electrolyte secondary battery according to claim 18, wherein the positive electrode lead tab is electrically connected to the positive electrode at an inner side of an outermost circumference of the electrode group, and the negative electrode lead tab is electrically connected to the negative electrode at an inner side of the outermost circumference of the electrode group.

20. The nonaqueous electrolyte secondary battery according to claim 18, wherein the positive electrode lead tab is electrically connected to the positive electrode at an outermost circumference of the electrode group, and the negative electrode lead tab is electrically connected to the negative electrode at an inner side of the outermost circumference of the electrode group.

21. The nonaqueous electrolyte secondary battery according to claim 18, wherein the negative electrode lead tab is electrically connected to the negative electrode at an outermost circumference of the electrode group, and the positive electrode lead tab is electrically connected to the positive electrode at an inner side of the outermost circumference of the electrode group.

22. The nonaqueous electrolyte secondary battery according to claim 18, wherein each of the positive electrode lead tab and the negative electrode lead tab has a width of 2 mm to 5 mm.

\* \* \* \* \*